United States Patent
Gotoh et al.

(10) Patent No.: US 7,813,236 B2
(45) Date of Patent: *Oct. 12, 2010

(54) INFORMATION RECORDING MEDIUM, INFORMATION RECORDING METHOD AND INFORMATION RECORDING/REPRODUCTION SYSTEM

(75) Inventors: Yoshiho Gotoh, Osaka (JP); Motoshi Ito, Osaka (JP); Hiroshi Ueda, Osaka (JP); Yoshihisa Fukushima, Osaka (JP)

(73) Assignee: Panasonic Corporation, Osaka (JP)

( * ) Notice: Subject to any disclaimer, the term of this patent is extended or adjusted under 35 U.S.C. 154(b) by 203 days.

This patent is subject to a terminal disclaimer.

(21) Appl. No.: 12/171,328

(22) Filed: Jul. 11, 2008

(65) Prior Publication Data

US 2008/0279073 A1 Nov. 13, 2008

Related U.S. Application Data

(63) Continuation of application No. 11/680,775, filed on Mar. 1, 2007, now abandoned, which is a continuation of application No. 11/330,552, filed on Jan. 12, 2006, now Pat. No. 7,206,268, which is a continuation of application No. 10/890,533, filed on Jul. 13, 2004, now Pat. No. 7,016,276, which is a continuation of application No. 10/427,634, filed on May 1, 2003, now Pat. No. 6,782,487, which is a continuation of application No. 09/494,594, filed on Jan. 31, 2000, now Pat. No. 6,581,167.

(30) Foreign Application Priority Data

Feb. 1, 1999 (JP) .................................. 11-024462

(51) Int. Cl.
G11B 5/09 (2006.01)
G11B 20/18 (2006.01)

(52) U.S. Cl. ............................. 369/47.14; 714/7; 714/8
(58) Field of Classification Search ............... 369/275.3, 369/47.1, 53.12, 53.17, 53.15, 47.14; 714/7–10
See application file for complete search history.

(56) References Cited

U.S. PATENT DOCUMENTS 5,111,444 A 5/1992 Fukushima et al.

(Continued)

FOREIGN PATENT DOCUMENTS

EP 0 350 920 7/1989

(Continued)

OTHER PUBLICATIONS

First Office Action on corresponding application No. JP 2000-083052 and English translation thereof.

(Continued)

*Primary Examiner*—Ali Neyzari
(74) *Attorney, Agent, or Firm*—Renner, Otto, Boisselle & Sklar, LLP

(57) ABSTRACT

An information recording medium including a plurality of sectors of the present invention includes: a first spare area including a spare sector for replacing a defective sector among the plurality of sectors; a defect management information area for managing the replacement of the defective sector by the spare sector; and a volume space in which user data can be recorded. The volume space is configured so that a second spare area including a spare sector for replacing a defective sector among the plurality of sectors can be additionally allocated. Location information indicating a location of the second spare area is recorded in the defect management information area.

3 Claims, 13 Drawing Sheets

U.S. PATENT DOCUMENTS

| | | | |
|---|---|---|---|
| 5,548,572 | A | 8/1996 | Kulakowski et al. |
| 5,715,221 | A | 2/1998 | Ito et al. |
| 6,160,778 | A | 12/2000 | Ito et al. |
| 6,212,647 | B1 | 4/2001 | Sims et al. |
| 6,292,445 | B1 | 9/2001 | Ito et al. |
| 6,295,257 | B1 | 9/2001 | Ito et al. |
| 6,385,148 | B2 | 5/2002 | Ito et al. |
| 6,453,384 | B1 | 9/2002 | Park et al. |
| 6,578,163 | B2 | 6/2003 | Ko |
| 6,581,167 | B1 | 6/2003 | Gotoh et al. |
| 6,782,487 | B2 | 8/2004 | Gotoh et al. |
| 7,016,276 | B2 | 3/2006 | Gotoh et al. |

FOREIGN PATENT DOCUMENTS

| | | |
|---|---|---|
| GB | 2 326 015 A | 9/1998 |
| JP | 63-124270 | 5/1988 |
| JP | 1-159871 | 6/1989 |
| JP | 2-230558 | 9/1990 |
| JP | 4-141721 | 5/1992 |
| JP | 5-54547 | 3/1993 |
| JP | 7-235139 | 9/1995 |
| JP | 9-265732 | 10/1997 |
| JP | 1-12674 | 4/2000 |
| KR | 1998-084072 | 5/1998 |

OTHER PUBLICATIONS

IBM Technical Disclosure Bulletin, vol. 38, No. 5, May 1995, "Dynamic Spare Sector Allocation in Hard Drive" (See Parent Application).

European Search Report, Application No. EP 00 10 1918.12210 dated Apr. 2000.

Korean Office Action for corresponding Application 9-5-2004-015555113, dated Apr. 26, 2004.

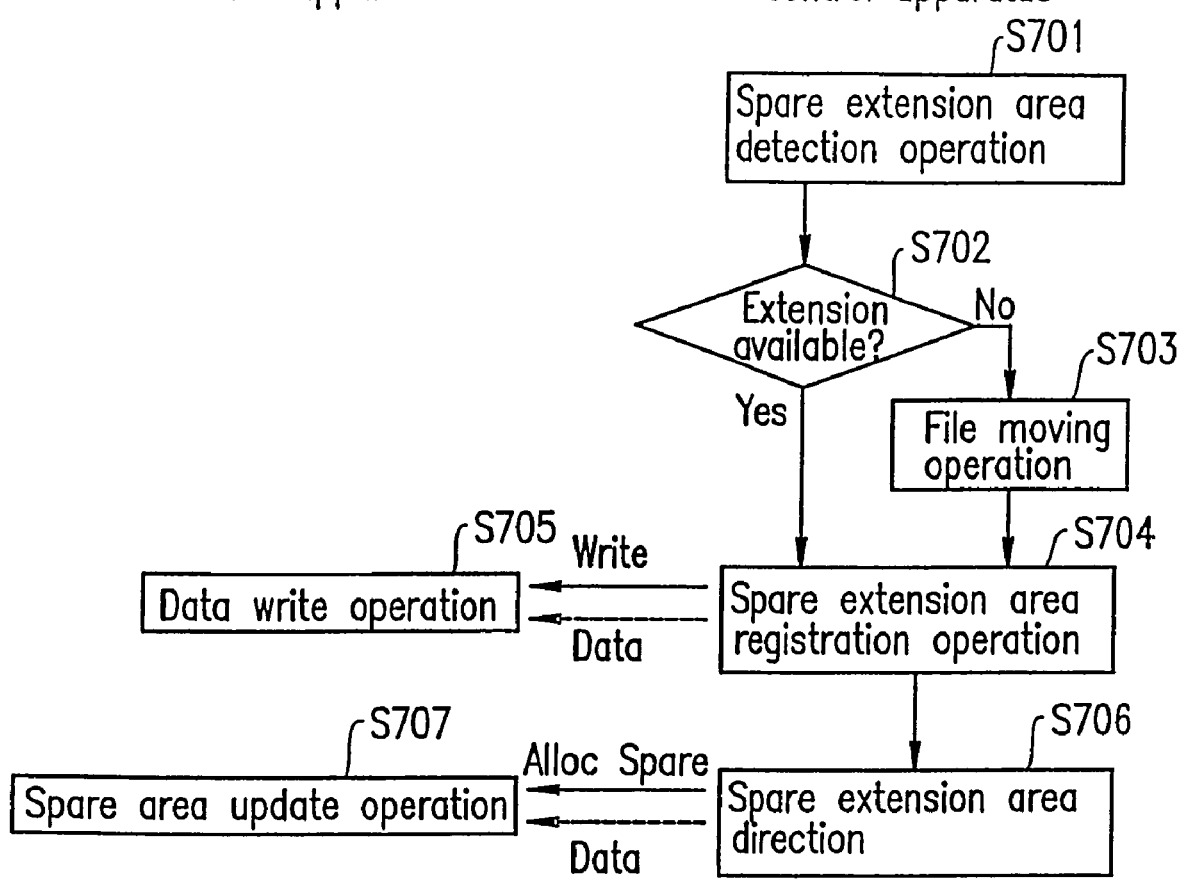

INFORMATION RECORDING MEDIUM, INFORMATION RECORDING METHOD AND INFORMATION RECORDING/REPRODUCTION SYSTEM

CROSS-REFERENCE TO RELATED APPLICATION

This application is a continuation of U.S. Non-provisional Application No. 11/680,775 filed on Mar. 1, 2007 now abandoned, which is a continuation of U.S. Non-provisional application Ser. No. 11/330,552 filed on Jan. 12, 2006, now U.S. Pat. No. 7,206,268, which is a continuation of U.S. Non-provisional application Ser. No. 10/890,533 filed on Jul. 13, 2004, now U.S. Pat. No. 7,016,276, which is a continuation of U.S. Non-provisional application Ser. No. 10/427,634 filed May 1, 2003, now U.S. Pat. No. 6,782,487, which is a continuation of U.S. Non-provisional application Ser. No. 09/494,594 filed Jan. 31, 2000, now U.S. Pat. No. 6,581,167, the contents of which are hereby incorporated by reference.

BACKGROUND OF THE INVENTION

1. Field of the Invention

The present invention relates to an information recording medium, an information recording method and an information recording/reproduction system, in which it is possible to increase the reliability of data recording by dynamically extending the spare area according to the frequency of occurrence of defective sectors.

2. Description of the Related Art

An optical disk is a type of information recording medium which has a sector structure. In recent years, as the recording density and the capacity of an optical disk have been increased, it has become more important to ensure the reliability thereof.

Conventionally, a defect management method is known in the art for managing defective sectors on the optical disk (i.e., sectors which cannot be used for recording/reproduction of data). A spare area is provided in advance on the optical disk. When there is a defective sector on the optical disk, the defective sector is replaced by another sector in the spare area. Thus, the reliability of the optical disk is ensured. Such a defect management method is described in International Standards Organization ISO/IEC 10090 for 90 mm optical disks.

The conventional defect management method described in the International Standards Organization ISO/IEC 10090 for 90 mm optical disks will now be outlined with reference to FIGS. 12 and 13.

FIG. 12 illustrates a structure of a data recording area 800 of a conventional optical disk.

The data recording area 800 includes a plurality of sectors. Each of the plurality of sectors is assigned a physical sector number (hereinafter, referred to as a "PSN").

The data recording area 800 includes a defect management information area 801, a spare area 802 and a volume space 800a. The volume space 800a is arranged immediately after the spare area 802, and is defined as an area in which user data can be recorded. Each of the sectors included in the volume space 800a is assigned a logical sector number (hereinafter, abbreviated as an "LSN").

The size of the spare area 802 is predetermined. In order to change the size of the spare area 802, it is necessary to change the data structure of the replacement information stored in the defect management information area 801 by using a special command with physical format utility software. This operation will hereinafter be referred to as an initialization operation.

FIG. 13 illustrates a procedure of a conventional format operation and a conventional data write operation. These operations are performed by a system control apparatus and an optical disk drive apparatus. The optical disk drive apparatus is connected to the system control apparatus. The system control apparatus is, for example, a computer system.

The format operation includes steps S901-S903 illustrated in FIG. 13. The data write operation includes steps S904-S911. In FIG. 12, each reference numeral that starts with "S" beside an arrow denotes a recording operation corresponding to a step illustrated in FIG. 13.

When an optical disk is inserted into the optical disk drive apparatus, the optical disk drive apparatus reads out the defect management information area 801 and recognizes replacement information which indicates that a defective sector has been replaced by a spare sector (step S901).

The system control apparatus performs a FAT/root directory creation operation, issues a Write command and transmits data to the optical disk drive apparatus (step S902).

The optical disk drive apparatus uses format utility software to recognize the physical structure of the optical disk and records the data transmitted from the system control apparatus from the beginning of the volume space 800a (step S903). As a result, a FAT area 803 and a root directory area 804 are arranged starting from the beginning of the volume space 800a. Such a logical format operation is similar to the format operation for a file system in a MS-DOS format. As a result, the area from immediately after the root directory area 804 to the end of the optical disk is handled as a file data space 800b which is managed by the FAT.

A data write operation for recording data (File-a) under the root directory will now be described.

The system control apparatus performs a recording operation for the data (File-a), issues a Write command and transmits data to the optical disk drive apparatus (step S904). The location at which the data should be recorded is specified by an LSN.

The optical disk drive apparatus records the data transmitted from the system control apparatus in a sector which is assigned the specified LSN (step S905). Whether or not the data has been correctly recorded is determined by reading out the recorded data and by comparing the read data with the transmitted data. When the data has not been correctly recorded, the sector which is assigned the specified LSN is detected as a defective sector. The defective sector occurs mainly due to dirt or dust attached to the optical disk.

For example, assume a case where sector b (sector 814) illustrated in FIG. 12 has been detected as a defective sector. In such a case, the optical disk drive apparatus records the data which is supposed to be recorded in the defective sector 814 in #1 spare sector 810 of the spare area 802, generates, as defect management information, #1 replacement entry 832 which indicates that the defective sector 814 has been replaced by the #1 spare sector 810, and records the #1 replacement entry 832 in the defect management information area 801 (step S906).

The #1 replacement entry 832 includes location information 833 indicating the location of the defective sector and location information 834 indicating the location of the spare sector by which it is replaced. Each of the location information 833 and 834 is represented by a PSN.

When the system control apparatus instructs the optical disk drive apparatus to read out data from the defective sector 814, the optical disk drive apparatus performs address conversion with reference to the #1 replacement entry 832 and reads out the data from the #1 spare sector 810.

Thus, by replacing a defective sector by a spare sector, it is possible to ensure the reliability of the optical disk. Moreover, since such defective sector replacement operation is performed by the optical disk drive apparatus, it is possible to ensure that the system control apparatus always records data at a location corresponding to the specified LSN. As a result, the system control apparatus can handle the optical disk as a defect-free medium.

Then, the system control apparatus performs a root directory recording operation, issues a Write command and transmits data to the optical disk drive apparatus (step S907).

The optical disk drive apparatus updates root directory information recorded in the root directory area 804 according to the data transmitted from the system control apparatus (step S908).

The system control apparatus performs a FAT recording operation, issues a Write command and transmits data to the optical disk drive apparatus (step S909).

The optical disk drive apparatus updates FAT information recorded in the FAT area 803 according to the data transmitted from the system control apparatus (step S910). Thus, the data (File-a) is registered under the root directory.

The optical disk drive apparatus records the updated defect management information in the defect management information area 801. Such recording is performed when there is no data recording instruction from the system control apparatus for a few seconds.

In the above-described conventional defect management method, the size of a spare area is fixed. Therefore, if there occurs defective sectors beyond the size of the replacement area, data cannot be recorded on the optical disk even when an unallocated area available for recording still exists on the optical disk. In order to record data on the optical disk, it is necessary to change the size of the spare area by performing another initialization operation on the optical disk. In such a case, data recorded in the volume space needed to be backed up on another medium before performing the initialization operation because the LSN allocation would be changed over the entire area of the volume space.

Especially, in a case where an optical disk is used with consumer equipment, the user may handle the optical disk while eating food or a child may inadvertently touch the surface of the optical disk, whereby more defective sectors may occur on the optical disk than expected by the manufacturer.

SUMMARY OF THE INVENTION

According to one aspect of this invention, an information recording medium including a plurality of sectors includes: a first spare area including a spare sector for replacing a defective sector among the plurality of sectors; a defect management information area for managing the replacement of the defective sector by the spare sector; and a volume space in which user data can be recorded. The volume space is configured so that a second spare area including a spare sector for replacing a defective sector among the plurality of sectors can be additionally allocated. Location information indicating a location of the second spare area is recorded in the defect management information area.

In one embodiment of the invention, the second spare area is allocated in an area separated from the first spare area.

In one embodiment of the invention, the second spare area is allocated in an area contiguous with the first spare area.

In one embodiment of the invention, each of the first spare area and the second spare area is assigned physical sector numbers. The physical sector numbers assigned to the first spare area are smaller than the physical sector numbers assigned to the second spare area.

In one embodiment of the invention, the second spare area includes a plurality of spare sectors. Each of the plurality of spare sectors is assigned a physical sector number. The defective sector is replaced by one of the plurality of spare sectors in descending order of the physical sector numbers respectively assigned to the plurality of spare sectors.

In one embodiment of the invention, the second spare area can be extended in a direction along which the physical sector number decreases.

In one embodiment of the invention, the second spare area is allocated outside the volume space.

In one embodiment of the invention, the second spare area is allocated inside the volume space. The location information indicating the location of the second spare area is recorded in a basic file structure management area for managing a basic file structure.

According to another aspect of this invention, an information recording medium including a plurality of sectors includes: a first spare area including a spare sector for replacing a defective sector among the plurality of sectors; a defect management information area for managing the replacement of the defective sector by the spare sector; and a volume space in which user data can be recorded. The volume space is configured so that a second spare area including a spare sector for replacing a defective sector among the plurality of sectors can be additionally allocated. Information indicating an amount of spare area available in the first spare area and information indicating an amount of spare area available in the second spare area are recorded in the defect management information area.

In one embodiment of the invention, the information of the amount of spare area available in the first spare area includes a replacement entry which indicates that the defective sector has been replaced by a spare sector in the first spare area. The information of the amount of spare area available in the second spare area includes a size of the second spare area and a replacement entry which indicates that the defective sector has been replaced by a spare sector in the second spare area.

In one embodiment of the invention, the information of the amount of spare area available in the first spare area includes a first full flag which indicates whether or not there is any spare sector available in the first spare area. The information of the amount of spare area available in the second spare area includes a second full flag which indicates whether or not there is any spare sector available in the second spare area.

According to still another aspect of this invention, there is provided an information recording method for recording information on an information recording medium including a plurality of sectors. The information recording medium includes: a first spare area including a spare sector for replacing a defective sector among the plurality of sectors; a defect management information area for managing the replacement of the defective sector by the spare sector; and a volume space in which user data can be recorded, wherein the volume space is configured so that a second spare area including a spare sector for replacing a defective sector among the plurality of sectors can be additionally allocated. The information recording method includes the steps of: (a) obtaining information which indicates a status of consumption of the first spare area; (b) determining whether or not to additionally allocate the second spare area according to the information which indicates the status of consumption of the first spare area; (c)

when it is determined to additionally allocate the second spare area, making a part of the volume space available as the second spare area; and (d) recording information indicating a location of the second spare area in the defect management information area.

In one embodiment of the invention, a first full flag which indicates whether or not there is any spare sector available in the first spare area is recorded in the defect management information area. The step (a) includes the step of determining whether or not there is any spare sector available in the first spare area by referencing the first full flag.

In one embodiment of the invention, a replacement entry which indicates that the defective sector has been replaced by a spare sector in the first spare area is recorded in the defect management information area. The step (a) includes the step of determining whether or not there is any spare sector available in the first spare area by referencing the replacement entry.

In one embodiment of the invention, the step (c) includes the steps of: (c-1) reducing the volume space; and (c-2) allocating an area on an outer periphery side following the reduced volume space as the second spare area.

In one embodiment of the invention, the step (c) includes the step of allocating a part of a logical volume space of the volume space as the second spare area.

In one embodiment of the invention, the step (c) includes the step of moving data recorded in a part of a logical volume space of the volume space to another part of the logical volume space, and then allocating the part of the logical volume space as the second spare area.

In one embodiment of the invention, the step (d) includes the step of, before recording the information indicating the location of the second spare area in the defect management information area, detecting a defective sector in the part of the volume space made available.

In one embodiment of the invention, the second spare area is allocated in an area separated from the first spare area.

In one embodiment of the invention, the second spare area is allocated in an area contiguous with the first spare area.

In one embodiment of the invention, each of the first spare area and the second spare area is assigned physical sector numbers. The physical sector numbers assigned to the first spare area are smaller than the physical sector numbers assigned to the second spare area.

In one embodiment of the invention, the second spare area includes a plurality of spare sectors. Each of the plurality of spare sectors is assigned a physical sector number. The defective sector is replaced by one of the plurality of spare sectors in descending order of the physical sector numbers respectively assigned to the plurality of spare sectors.

In one embodiment of the invention, the second spare area can be extended in a direction along which the physical sector number decreases.

According to still another aspect of this invention, there is provided an information recording method for recording information on an information recording medium including a plurality of sectors. The information recording medium includes: a first spare area including a spare sector for replacing a defective sector among the plurality of sectors; a defect management information area for managing the replacement of the defective sector by the spare sector; and a volume space in which user data can be recorded, wherein the volume space is configured so that a second spare area including a spare sector for replacing a defective sector among the plurality of sectors can be additionally allocated. The information recording method includes the steps of: (a) obtaining information which indicates a status of consumption of the second spare area; (b) determining whether or not to additionally allocate the second spare area according to the information which indicates the status of consumption of the second spare area; (c) when it is determined to additionally allocate the second spare area, making a part of the volume space available as the second spare area; and (d) recording information indicating a location of the second spare area in the defect management information area.

In one embodiment of the invention, a second full flag which indicates whether or not there is any spare sector available in the second spare area is recorded in the defect management information area. The step (a) includes the step of determining whether or not there is any spare sector available in the second spare area by referencing the second full flag.

In one embodiment of the invention, a replacement entry which indicates that the defective sector has been replaced by a spare sector in the second spare area is recorded in the defect management information area. The step (a) includes the step of determining whether or not there is any spare sector available in the second spare area by referencing the replacement entry.

In one embodiment of the invention, the step (c) includes the steps of: (c-1) reducing the volume space; and (c-2) allocating an area on an outer periphery side following the reduced volume space as the second spare area.

In one embodiment of the invention, the step (c) includes the step of allocating a part of a logical volume space of the volume space as the second spare area.

In one embodiment of the invention, the step (c) includes the step of moving data recorded in a part of a logical volume space of the volume space to another part of the logical volume space, and then allocating the part of the logical volume space as the second spare area.

In one embodiment of the invention, the step (d) includes the step of, before recording the information indicating the location of the second spare area in the defect management information area, detecting a defective sector in the part of the volume space made available.

In one embodiment of the invention, the step (d) includes the step of resetting a second full flag which indicates whether or not there is any spare sector available in the second spare area, after recording the information indicating the location of the second spare area in the defect management information area.

In one embodiment of the invention, the second spare area is allocated in an area separated from the first spare area.

In one embodiment of the invention, the second spare area is allocated in an area contiguous with the first spare area.

In one embodiment of the invention, each of the first spare area and the second spare area is assigned physical sector numbers. The physical sector numbers assigned to the first spare area are smaller than the physical sector numbers assigned to the second spare area.

In one embodiment of the invention, the second spare area includes a plurality of spare sectors. Each of the plurality of spare sectors is assigned a physical sector number. The defective sector is replaced by one of the plurality of spare sectors in descending order of the physical sector numbers respectively assigned to the plurality of spare sectors.

In one embodiment of the invention, the second spare area can be extended in a direction along which the physical sector number decreases.

According to still another aspect of this invention, there is provided an information recording/reproduction system for an information recording medium including a plurality of sectors. The information recording medium includes: a first spare area including a spare sector for replacing a defective sector among the plurality of sectors; a defect management information area for managing the replacement of the defective sector by the spare sector; and a volume space in which user data can be recorded, wherein the volume space is configured so that a second spare area including a spare sector for replacing a defective sector among the plurality of sectors can be additionally allocated. The information recording/reproduction system includes: a remaining spare area amount detection section for obtaining information indicating a status of consumption of the first spare area; a spare area extension determination section for determining whether or not to additionally allocate the second spare area according to the information indicating the status of consumption of the first spare area; a spare extension area allocation section for, when it is determined to additionally allocate the second spare area, making a part of the volume space available as the second spare area; and a spare area allocation section for recording location information indicating a location of the second spare area in the defect management information area.

In one embodiment of the invention, a first full flag which indicates whether or not there is any spare sector available in the first spare area is recorded in the defect management information area. The remaining spare area amount detection section determines whether or not there is any spare sector available in the first spare area by referencing the first full flag.

In one embodiment of the invention, a replacement entry which indicates that the defective sector has been replaced by a spare sector in the first spare area is recorded in the defect management information area. The remaining spare area amount detection section determines whether or not there is any spare sector available in the first spare area by referencing the replacement entry.

In one embodiment of the invention, the spare extension area allocation section reduces the volume space, and allocates an area on an outer periphery side following the reduced volume space as the second spare area.

In one embodiment of the invention, the spare extension area allocation section allocates a part of a logical volume space of the volume space as the second spare area.

In one embodiment of the invention, the spare extension area allocation section moves data recorded in a part of a logical volume space of the volume space to another part of the logical volume space, and then allocates the part of the logical volume space as the second spare area.

In one embodiment of the invention, the second spare area is allocated in an area separated from the first spare area.

In one embodiment of the invention, the second spare area is allocated in an area contiguous with the first spare area.

In one embodiment of the invention, each of the first spare area and the second spare area is assigned physical sector numbers. The physical sector numbers assigned to the first spare area are smaller than the physical sector numbers assigned to the second spare area.

In one embodiment of the invention, the second spare area includes a plurality of spare sectors. Each of the plurality of spare sectors is assigned a physical sector number. The defective sector is replaced by one of the plurality of spare sectors in descending order of the physical sector numbers respectively assigned to the plurality of spare sectors.

In one embodiment of the invention, the second spare area can be extended in a direction along which the physical sector number decreases.

In one embodiment of the invention, the information recording/reproduction system includes a recording apparatus for recording information on the information recording medium and a control apparatus for controlling the recording apparatus. The recording apparatus includes a remaining spare amount reporting section for reporting to the control apparatus information indicating a status of consumption of the first spare area which is obtained from the remaining spare area amount detection section.

In one embodiment of the invention, the information indicating the status of consumption of the first spare area includes information indicating a remaining amount of the first spare area.

In one embodiment of the invention, the information indicating the status of consumption of the first spare area includes information indicating an error status in response to a data recording instruction.

According to still another aspect of this invention, there is provided an information recording/reproduction system for an information recording medium including a plurality of sectors. The information recording medium includes: a first spare area including a spare sector for replacing a defective sector among the plurality of sectors; a defect management information area for managing the replacement of the defective sector by the spare sector; and a volume space in which user data can be recorded, wherein the volume space is configured so that a second spare area including a spare sector for replacing a defective sector among the plurality of sectors can be additionally allocated. The information recording/reproduction system includes: a remaining spare area amount detection section for obtaining information indicating a status of consumption of the second spare area; a spare area extension determination section for determining whether or not to additionally allocate the second spare area according to the information indicating the status of consumption of the second spare area; a spare extension area allocation section for, when it is determined to additionally allocate the second spare area, making a part of the volume space available as the second spare area; and a spare area allocation section for recording location information indicating a location of the second spare area in the defect management information area.

In one embodiment of the invention, a second full flag which indicates whether or not there is any spare sector available in the second spare area is recorded in the defect management information area. The remaining spare area amount detection section determines whether or not there is any spare sector available in the second spare area by referencing the second full flag.

In one embodiment of the invention, a replacement entry which indicates that the defective sector has been replaced by a spare sector in the second spare area is recorded in the defect management information area. The remaining spare area amount detection section determines whether or not there is any spare sector available in the second spare area by referencing the replacement entry.

In one embodiment of the invention, the spare extension area allocation section reduces the volume space, and allocates an area on an outer periphery side following the reduced volume space as the second spare area.

In one embodiment of the invention, the spare extension area allocation section allocates a part of a logical volume space of the volume space as the second spare area.

In one embodiment of the invention, the spare extension area allocation section moves data recorded in a part of a logical volume space of the volume space to another part of the logical volume space, and then allocates the part of the logical volume space as the second spare area.

In one embodiment of the invention, the spare extension area allocation section resets a second full flag which indicates whether or not there is any spare sector available in the second spare area, after recording the information indicating the location of the second spare area in the defect management information area.

In one embodiment of the invention, the second spare area is allocated in an area separated from the first spare area.

In one embodiment of the invention, the second spare area is allocated in an area contiguous with the first spare area.

In one embodiment of the invention, each of the first spare area and the second spare area is assigned physical sector numbers. The physical sector numbers assigned to the first spare area are smaller than the physical sector numbers assigned to the second spare area.

In one embodiment of the invention, the second spare area includes a plurality of spare sectors; each of the plurality of spare sectors is assigned a physical sector number; and the defective sector is replaced by one of the plurality of spare sectors in descending order of the physical sector numbers respectively assigned to the plurality of spare sectors.

In one embodiment of the invention, the second spare area can be extended in a direction along which the physical sector number decreases.

In one embodiment of the invention, the information recording/reproduction system includes a recording apparatus for recording information on the information recording medium and a control apparatus for controlling the recording apparatus. The recording apparatus includes a remaining spare amount reporting section for reporting to the control apparatus information indicating a status of consumption of the second spare area which is obtained from the remaining spare area amount detection section.

In one embodiment of the invention, the information indicating the status of consumption of the second spare area includes information indicating a remaining amount of the second spare area.

In one embodiment of the invention, the information indicating the status of consumption of the second spare area includes information indicating an error status in response to a data recording instruction.

Thus, the invention described herein makes possible the advantage of providing an information recording medium, an information recording method and an information recording/reproduction system, in which it is possible to increase the reliability of data recording by dynamically extending the spare area according to the frequency of occurrence of defective sectors.

This and other advantages of the present invention will become apparent to those skilled in the art upon reading and understanding the following detailed description with reference to the accompanying figures.

BRIEF DESCRIPTION OF THE DRAWINGS

FIG. 7 is a protocol chart illustrating a procedure of an operation of extending the first spare area 102 and a second spare area 108;

DESCRIPTION OF THE PREFERRED EMBODIMENTS

An information recording medium of the present invention includes a first spare area including a spare sector for replacing a defective sector, a defect management information area for managing replacement of a defective sector by a spare sector, and a volume space in which user data can be recorded.

The volume space is configured so that a second spare area including a spare sector for replacing a defective sector can be additionally allocated. When all of the spare sectors provided in advance in the first spare area have been consumed by the defective sector replacement operation, a part of the volume space is made available as a second spare area. Thus, by additionally allocating the second spare area when necessary, it is possible to ensure the defect-free property of the optical disk even when there occurs more defective sectors than expected by the manufacturer of the optical disk.

Location information indicating the location of the second spare area is recorded in the defect management information area.

Embodiments of the present invention will now be described with reference to the drawings.

Embodiment 1 is an embodiment in which the second spare area is allocated inside the volume space by updating is the file structure. Embodiment 2 is an embodiment in which the second spare area is allocated outside the volume space by updating the volume structure and the file structure.

Embodiment 1

Figure 2:
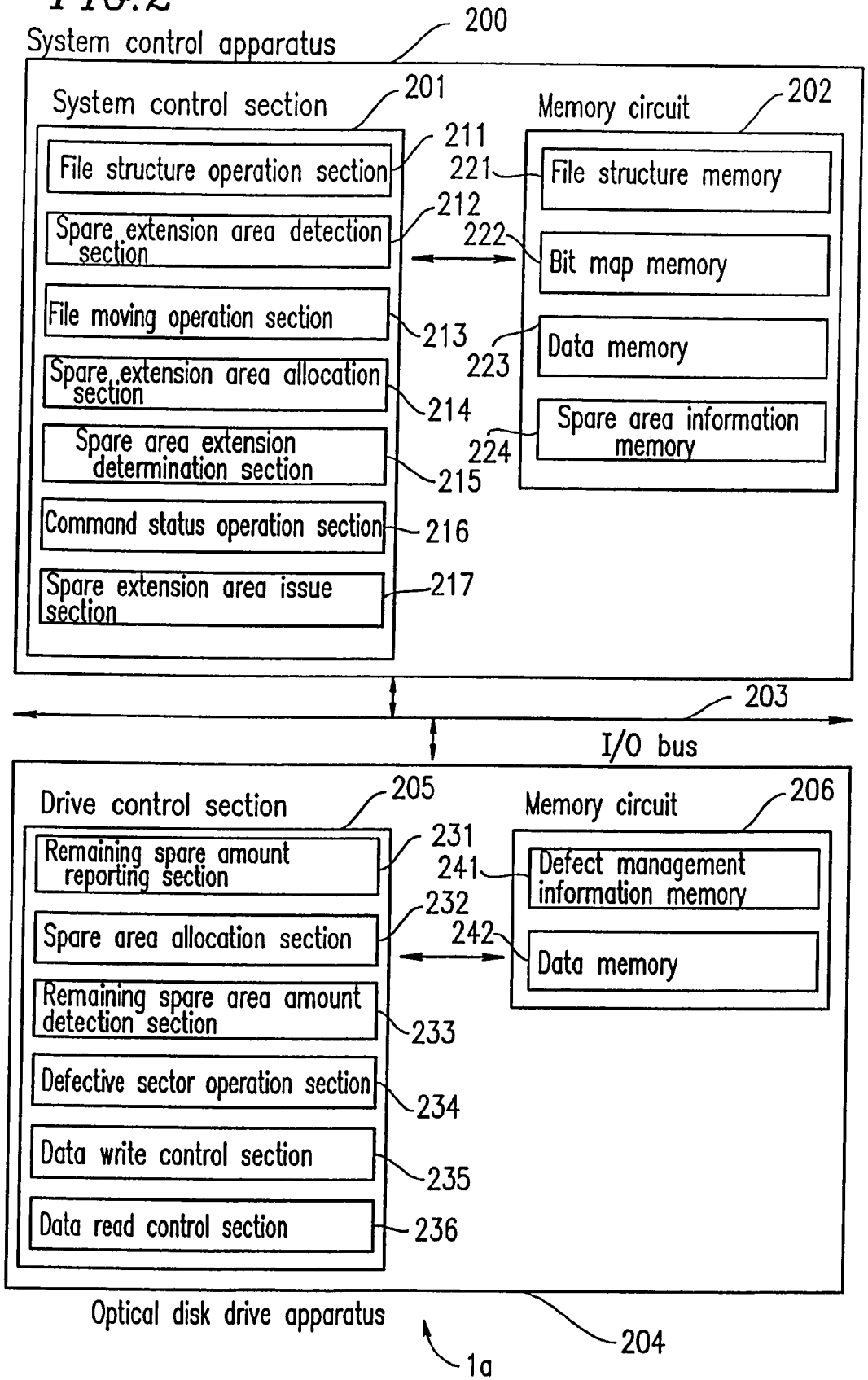
FIG. 2 is a block diagram illustrating a structure of an information recording/reproduction system 1a according to an embodiment of the present invention.

FIG. 2 illustrates a structure of an information recording/reproduction system 1a according to an embodiment of the present invention. The information recording/reproduction system 1a records information on the information recording medium and reproduces information recorded on the information recording medium. The information recording medium may be any type of rewritable optical disk such as a DVD-RAM.

It is assumed in the following description that the information recording medium is a rewritable optical disk on/from which files managed by a file structure defined in the ECMA167 standard can be recorded/reproduced by sectors. Hereinafter, such a rewritable optical disk will be referred to simply as an optical disk.

As illustrated in FIG. 2, the information recording/reproduction system 1a includes a system control apparatus 200 and an optical disk drive apparatus 204. The system control apparatus 200 and the optical disk drive apparatus 204 are connected to each other via an I/O bus 203.

The system control apparatus 200 includes a system control section 201 for processing file structure information and a memory circuit 202. The system control section 201 may be implemented by, for example, a microprocessor including a control program and a memory for storing operation results.

The system control section 201 includes: a file structure operation section 211 for performing a bit map operation for managing unallocated areas in a logical volume space; a spare extension area detection section 212 for examining whether or not an area which is determined to be allocated as an additional spare area has already been used; a file moving operation section 213 for allocating an additional spare area by moving a file recorded in the area which is determined to be allocated as an additional spare area to another area; a spare extension area allocation section 214 for registering an additional spare area in a file structure; a spare area extension determination section 215 for determining whether or not the spare area should be extended based on the amount of spare area remaining; a command status operation section 216 for recognizing whether or not a defective sector has been detected during data recording by the execution result of a Write command; and a spare extension area issue section 217 for directing a spare area to be extended for the optical disk drive apparatus 204 for updating the defect management information.

The memory circuit 202 includes a file structure memory 221, a bit map memory 222, a data memory 223, and a spare area information memory 224 for storing information indicating the amount of spare area remaining and information indicating the location of the spare area.

The optical disk drive apparatus 204 includes a drive control section 205 for performing a defect management operation and controlling the recording/reproduction of data on/from the optical disk, and a memory circuit 206. The drive control section 205 may be implemented by, for example, a microprocessor including a control program and a memory for arithmetic operations.

The drive control section 205 includes: a remaining spare amount reporting section 231 for reporting the area size which can be replaced by the spare area; a spare area allocation section 232 for updating defect management information according to a spare area extension command from the system control apparatus 200; a remaining spare area amount detection section 233 for detecting the area which can be replaced by the spare area based on a replacement entry of the defect management information area; a defective sector operation section 234 for allocating a defective sector detected during data recording by a spare sector of the spare area and recording data in the spare sector; a data write control section 235 for controlling recording of data to the optical disk; and a data read control section 236 for controlling reproduction of data from the optical disk.

The memory circuit 206 includes a defect management information memory 241 for storing the defect management information, and a data memory 242.

A format operation performed on an optical disk according to the present invention will now be described with reference to FIGS. 1, 2, 3 and 4.

Figure 4:
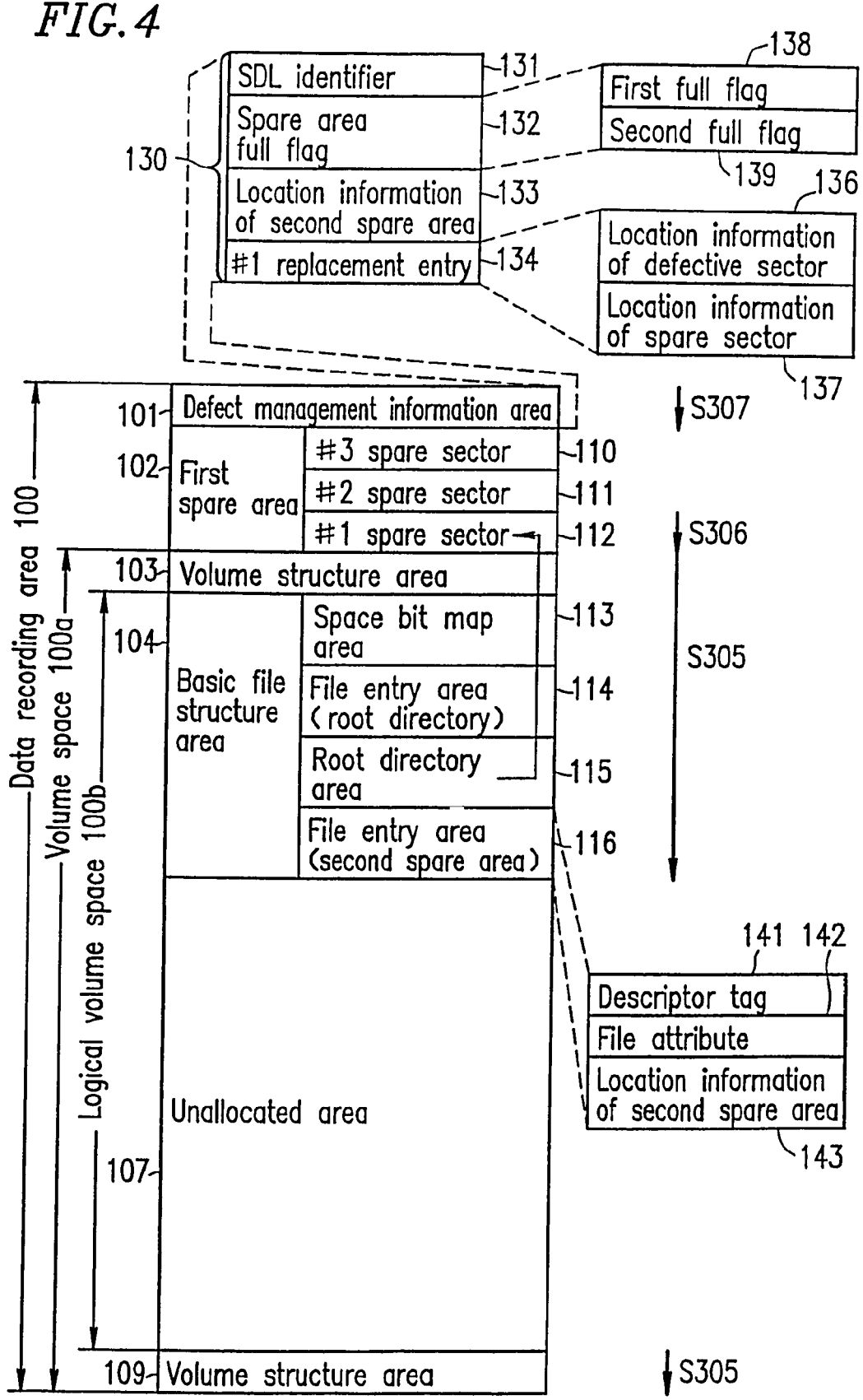
FIG. 4 is a diagram illustrating a structure of the data recording area 100 of an optical disk after a format operation.

FIG. 4 illustrates a structure of the data recording area 100 of an optical disk after the format operation.

The data recording area 100 includes a plurality of sectors. Each of the plurality of sectors is assigned a PSN.

The data recording area 100 includes a defect management information area 101, a first spare area 102 and a volume space 100a.

Defect management information 130 is recorded in the defect management information area 101. The defect management information 130 includes an SDL descriptor 131 for identifying SDL information, a spare area full flag 132, location information 133 indicating the location of the second spare area 108, and #1 replacement entry 134 indicating that a defective sector has been replaced by a spare sector.

The spare area full flag 132 includes a first full flag 138 for the first spare area 102 and a second full flag 139 for the second spare area 108. The first full flag 138 indicates whether or not there is any spare sector available in the first spare area 102. The second full flag 139, when it is reset, indicates that there is a spare sector available in the second spare area 108. The second full flag 139, when it is set, indicates that there is no more spare sector available in the second spare area 108 or that no second spare area 108 has been allocated.

Hereinafter, the location information 133 indicating the location of the second spare area 108 will be referred to simply as the "second spare area location information 133". The second spare area location information 133 is represented by, for example, the PSN of the first sector included in the second spare area 108 and the PSN of the last sector included in the second spare area 108.

In the example illustrated in FIG. 4, the second spare area has not yet been allocated on the data recording area 100. In such a case, the second spare area location information 133 has a value (e.g., the NULL value) which indicates that "the second spare area has not yet been allocated on the data recording area 100".

In the example illustrated in FIG. 4, the number of replacement entries included in the defect management information 130 is 1. The defect management information 130 may include a number of replacement entries equal to the number of spare sectors replacing defective sectors. Therefore, when the number of spare sectors replacing defective sectors is N, the defect management information 130 may include #1-#N replacement entries. Herein, N is any integer. Each of the #1-#N replacement entries includes location information 136 indicating the location of the defective sector and location information 137 indicating the location of the spare sector replacing the defective sector. Each of the location information 136 and 137 is represented by, for example, a PSN.

The size of the first spare area 102 is fixed. In the example illustrated in FIG. 4, the first spare area 102 includes three spare sectors 110-112, i.e., #1 spare sector to #3 spare sector. Each of the spare sectors 110-112 is used to replace a defective sector. The number of spare sectors included in the first spare area 102 is not limited to 3. The first spare area 102 may include any number of spare sectors.

The volume space 10a is arranged immediately after the first spare area 102, and is defined as an area in which user data can be recorded. Each of the sectors included in the volume space 10a is assigned a logical sector number. The volume space 100a includes the volume structure area 103, a logical volume space 10b and the volume structure area 109.

Figure 3:
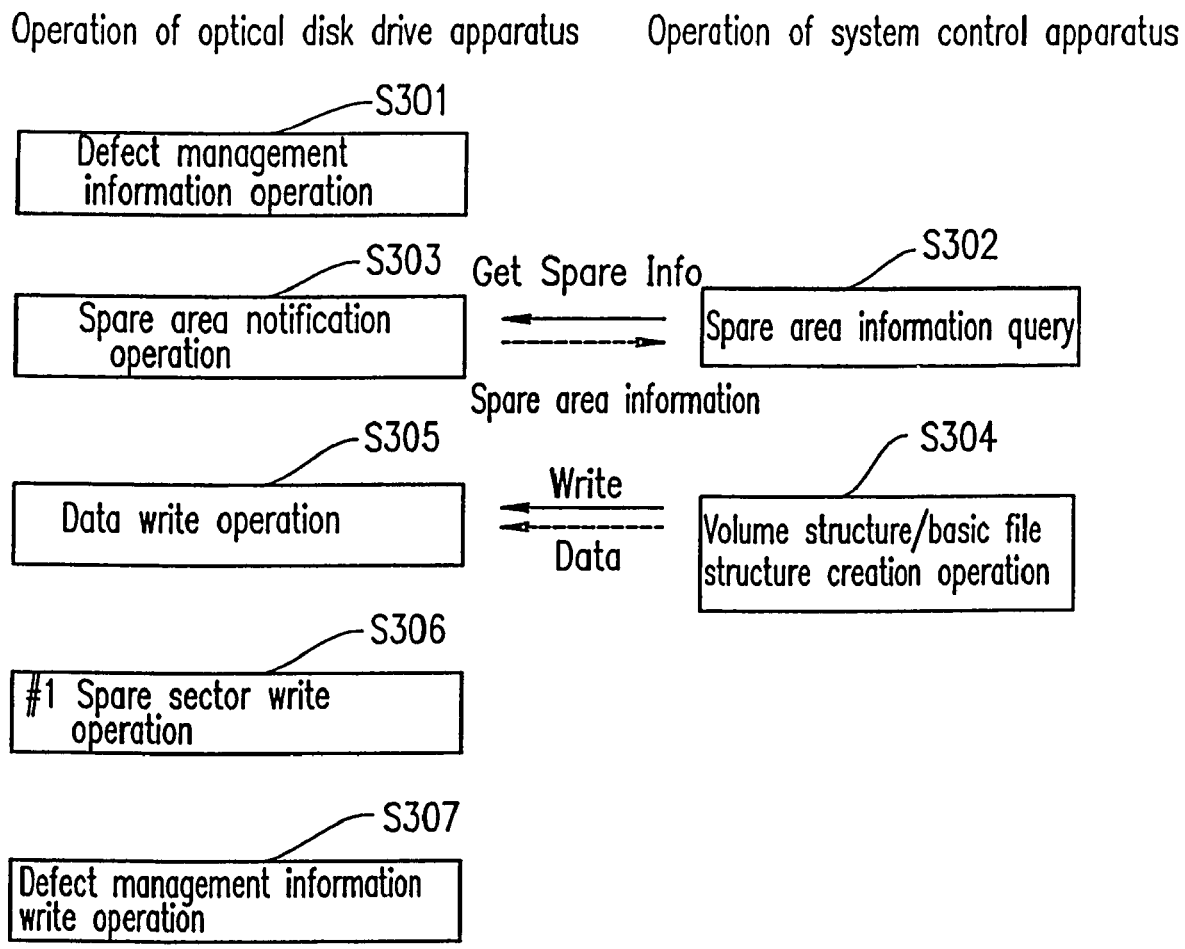
FIG. 3 is a protocol chart illustrating a procedure of a format operation.

FIG. 3 illustrates a procedure of a format operation. The format operation is performed by the system control apparatus 200 and the optical disk drive apparatus 204.

The format operation includes steps S301-S307 illustrated in FIG. 3. In FIG. 4, each reference numeral that starts with "S" beside an arrow denotes a recording operation corresponding to a step illustrated in FIG. 3.

When the optical disk is inserted into the optical disk drive apparatus 204, the defect management information 130 is read out from the defect management information area 101. The defect management information 130 is stored in the defect management information memory 241.

The defect management information 130 stored in the defect management information memory 241 is referenced by the remaining spare amount reporting section 231 and the remaining spare area amount detection section 233, as will be described below.

The remaining spare area amount detection section 233 recognizes the location information of the first and second spare areas and the status of consumption of the first and second spare areas (step S301). The status of consumption of each spare area is recognized by, for example, retrieving one of the replacement entries recorded in the defect management information area 101 that has the smallest address information (e.g., the physical sector number) of a spare sector.

The file structure operation section 211 issues a Get Spare Info command to the optical disk drive apparatus 204 in order to inquire as to the spare area information (step S302).

The remaining spare amount reporting section 231 reports the spare area information to the system control apparatus 200 based on the defect management information 130 stored in the defect management information memory 241 (step S303). The spare area information includes the location information 133 indicating the location of the second spare area. The spare area information is stored in the spare area information memory 224.

The file structure operation section 211 performs a volume structure/basic file structure creation operation and issues a Write command and transmits data to the optical disk drive apparatus 204 (step S304). The data is once stored in the file structure memory 221, and then transferred from the file structure memory 221 to the data memory 242.

The data write control section 235 records data stored in the data memory 242 starting from the beginning of the volume space 10a (i.e., the sector assigned the LSN "0") (step S305). As a result, the volume structure area 103 and the basic file structure area 104 are allocated starting from the beginning of the volume space 100a.

Although not shown in FIG. 4, an anchor volume descriptor pointer, a volume descriptor sequence, a file set descriptor, a file entry for the system stream directory and the system stream directory are recorded in the volume structure area 103.

The basic file structure area 104 includes a space bit map area 113, a file entry area 114, a root directory area 115 and a file entry area 116.

A space bit map is recorded in the space bit map area 113. The space bit map is a string of bits which indicates the allocation status in each sector of the logical volume space 100b. By referencing the space bit map, it is possible to examine the status of consumption of each sector in the logical volume space 100b.

The location information and management information for the root directory area 115 are recorded in the file entry area 114.

The names of the files recorded under the root directory and the location information for the file entry of each of such files are recorded in the root directory area 115.

A file entry specified by the system stream directory is recorded in the file entry area 116. The location information of the stream of the second spare area to be registered in the system stream directory is managed by this file entry. The file entry includes a descriptor tag 141 for identifying the file entry, a file attribute 142 and location information 143 indicating the location of the second spare area 108.

Hereinafter, the location information 143 indicating the location of the second spare area 108 will be referred to simply as the "second spare area location information 143". The second spare area location information 143 is represented by, for example, the LSN of the first sector included in the second spare area 108 and the size of the second spare area 108.

In the format operation, information equivalent to the second spare area location information 133 included in the defect management information 130 is recorded in the file entry area 116 as the second spare area location information 143. In the example illustrated in FIG. 4, the second spare area location information 133 has the NULL value, as discussed above. Accordingly, the second spare area location information 143 also has the NULL value.

Whether or not the data transmitted from the system control apparatus 200 has been correctly recorded in the volume structure area 103 and the basic file structure area 104 is determined by reading out the recorded data and by comparing the read data with the transmitted data (i.e., the data stored in the data memory 242). Such a determination is performed by the defective sector operation section 234.

For example, when the data transmitted from the system control apparatus 200 is not correctly recorded in the root directory area 115, the root directory area 115 is detected as a defective sector. In such a case, the defective sector operation section 234 replaces the root directory area 115 by one of the available spare sectors included in the first spare area 102 that has the largest address (i.e., the #1 spare sector 112). As a result, data which is supposed to be recorded in the root directory area 115 is recorded in the #1 spare sector 112 of the first spare area 102. Moreover, the defective sector operation section 234 generates the #1 replacement entry 134 which indicates that the root directory area 115 has been replaced by the #1 spare sector 112 and stores the #1 replacement entry 134 in the defect management information memory 241 (step S306).

The defective sector operation section 234 records the updated defect management information 130 stored in the defect management information memory 241 in the defect management information area 101 (step S307). Such recording is performed immediately after step S306 or when there is no command to record the data from the system control apparatus 200 for a predetermined period of time (e.g., 5 seconds).

As described above, in the optical disk format operation, information that has consistency with the second spare area location information 133 recorded in the defect management information area 101 is recorded in the basic file structure area 104 as the second spare area location information 143. By performing the above-described format operation on a used optical disk, it is possible to reuse the used optical disk. This is because even if all of the information in the volume space 10a is erased, the information in the second spare area is stored in the defect management information area 101.

The second spare area location information 143 is managed by the system control apparatus 200, and the second spare area location information 133 is managed by the optical disk drive apparatus 204. It is necessary to ensure that the location information 143 and 133 always have consistency with each other. Countermeasures which can be taken when the information 143 and 133 are not consistent with each other and a method for recovering the inconsistency between the information 143 and 133 will be described later.

A data write operation of recording a file named "File-a" under the root directory of a formatted optical disk will now be described with reference to FIGS. 1, 2 and 5.

Figure 1:
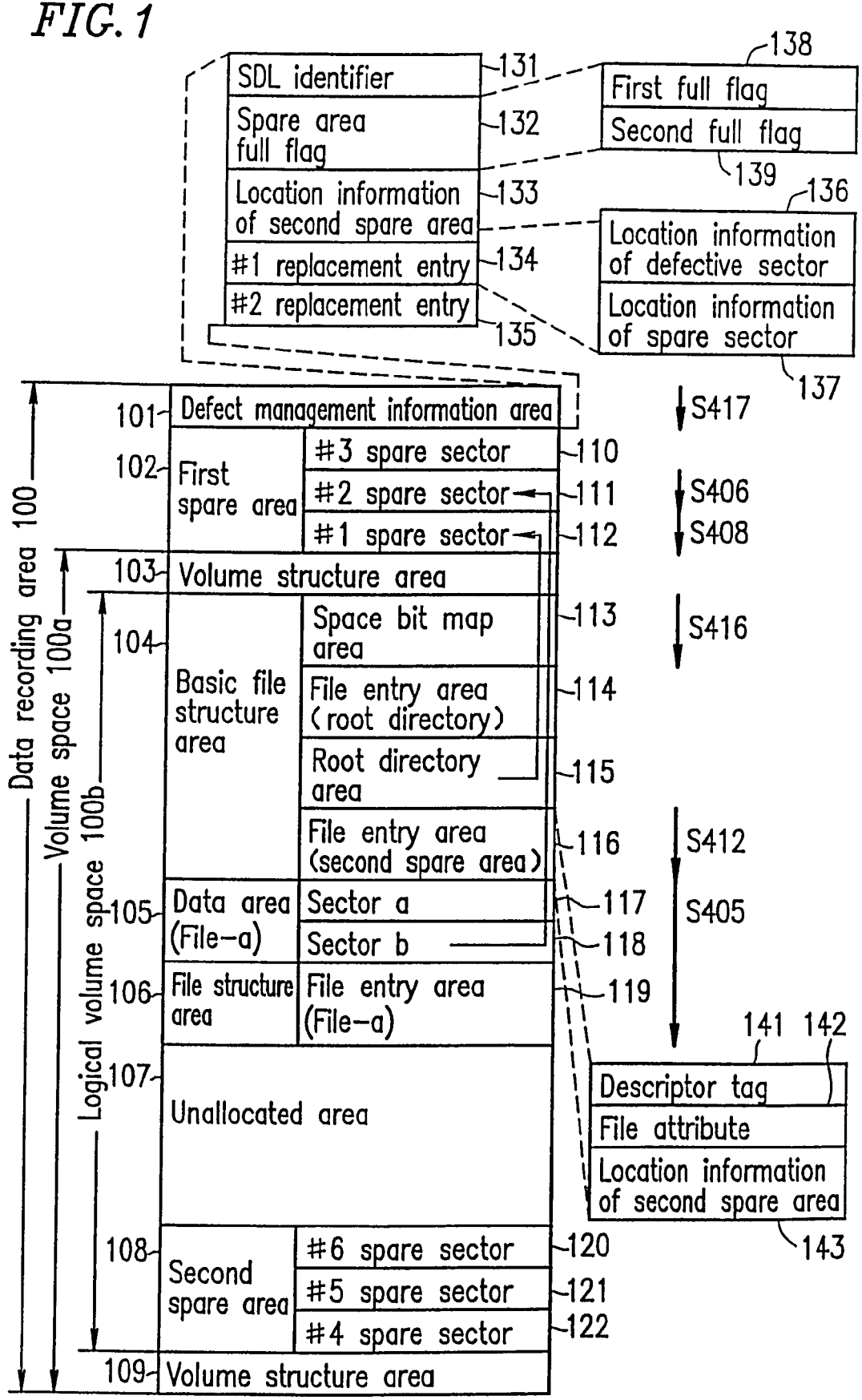
FIG. 1 is a diagram illustrating a structure of a data recording area 100 of an optical disk according to an embodiment of the present invention.

FIG. 1 illustrates a structure of the data recording area 100 of the optical disk after the data write operation.

Figure 5:
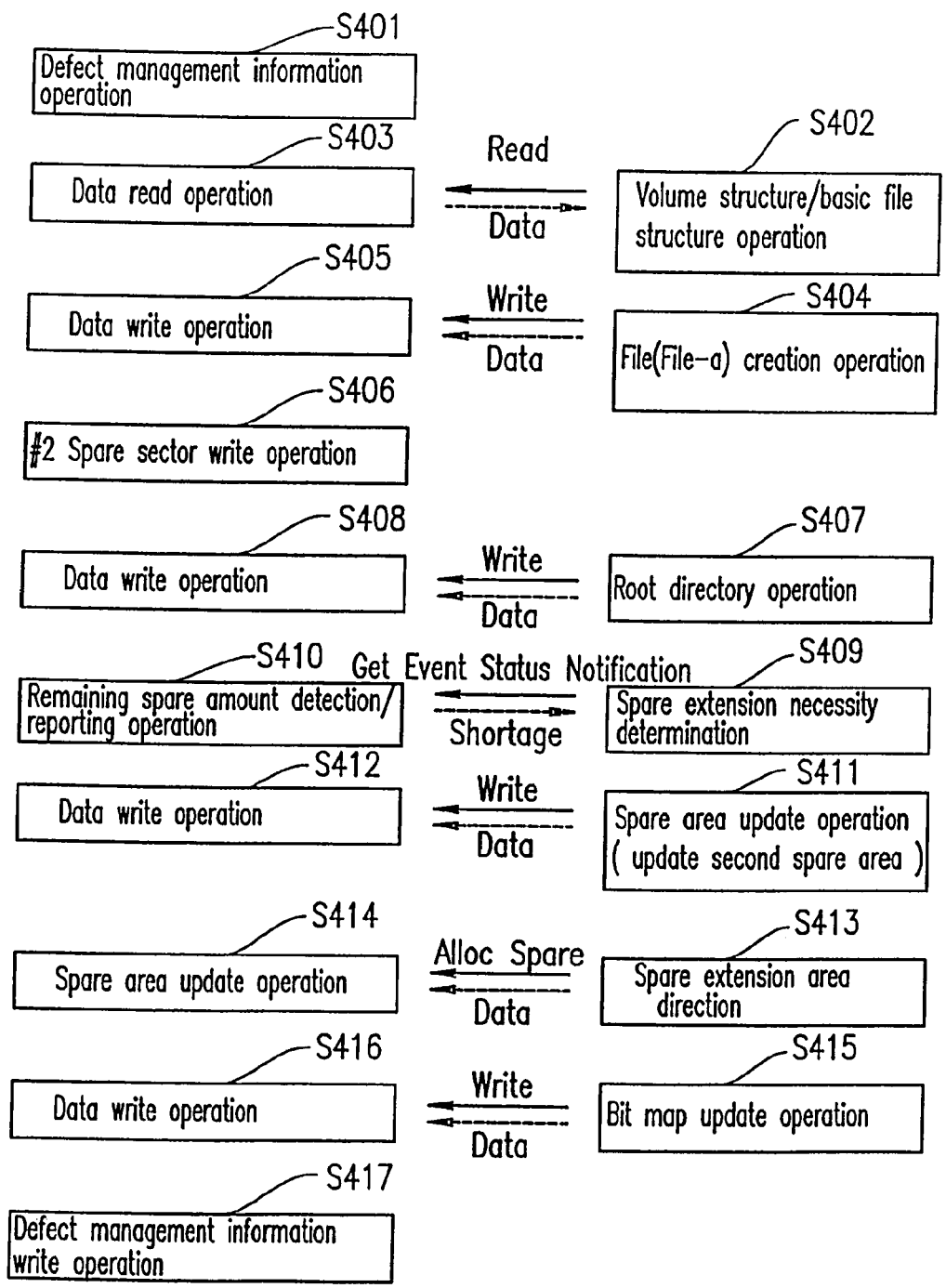
FIG. 5 is a protocol chart illustrating a procedure of a data write operation.

FIG. 5 illustrates a procedure of the data write operation. The data write operation is performed by the system control apparatus 200 and the optical disk drive apparatus 204.

The data write operation includes steps S401-S417 illustrated in FIG. 5. In FIG. 1, each reference numeral that starts with "S" beside an arrow denotes a recording operation corresponding to a step illustrated in FIG. 5.

When the optical disk is inserted into the optical disk drive apparatus 204, the same defect management information operation as that done in the format operation is performed as a start-up operation for the optical disk drive apparatus 204 (step S401).

The file structure operation section 211 issues a Read command to the optical disk drive apparatus 204 as a start-up operation for the system control apparatus 200 (step S402).

The data read control section 236 reproduces data from the volume structure area 103 and the basic file structure area 104 according to the address specified by the Read command and transmits the reproduced data to the file structure memory 221 (step S403).

The file structure operation section 211 analyzes the volume structure and the basic file structure based on the data transmitted to the file structure memory 221. As a result, the file structure operation section 211 recognizes the logical volume space 10a based on the data reproduced from the volume structure area 103, recognizes the location and the size of an unallocated area 107 based on the data reproduced from the space bit map area 113, recognizes the directory structure based on the data reproduced from the root directory area 115, and recognizes the second spare area location information 143 based on the data reproduced from the file entry area 116 (step S402).

The file structure operation section 211 creates data of a file named "File-a" and stores the data in the data memory 223. Moreover, the file structure operation section 211 creates data of a file entry and stores the data in the file structure memory 221. The file structure operation section 211 issues a Write command and each data to the optical disk drive apparatus 204 (step S404). The Write command is used to record each data at the address of the unallocated area 107 recognized in step S402.

The data stored in the data memory 223 and the data stored in the file structure memory 221 are transmitted to the data memory 242. The data write control section 235 records the respective data transmitted in the data memory 242 in a data area 105 and in a file structure area 106 according to the addresses specified by the Write command (step S405).

The defective sector operation section 234 performs a replacement operation by the same method as that described in the description of the format operation. For example, assume a case where sector b (sector 118) illustrated in FIG. 1 has been detected as a defective sector. In such a case, the defective sector operation section 234 records the data, which is supposed to be recorded in the defective sector 118, in #2 spare sector 111 of the first spare area 102, generates #2 replacement entry 135 which indicates that the defective sector 118 has been replaced by the #2 spare sector 111, and records the #2 replacement entry 135 in the defect management information memory 241 (step S406).

In order to register the file (File-a) under the root directory, it is necessary to update the data recorded in the root directory area 115. The file structure operation section 211 issues the Write command and transmits the data to the optical disk drive apparatus 204 (step S407).

The data write control section 235 references the #1 replacement entry 134, converts the address of the root directory area 115 specified by the Write command to the address of the #1 spare sector 112, and records the data transmitted from the system control apparatus 200 in the #1 spare sector 112 (step S408).

The spare area extension determination section 215 determines, based on the status of consumption of the first spare area 102, whether or not it is necessary to extend the first spare area 102. There are various methods for such a determination. The details of such various methods will later be described with reference to FIGS. 6A-6C.

Herein, an example of such determination methods will be described. For example, the spare area extension determination section 215 issues a Get Event Status Notification command to the optical disk drive apparatus 204. This command is used to inquire as to the status of consumption of the first spare area 102. In response to this inquiry, the spare area extension determination section 215 determines that it is necessary to extend the first spare area 102 when the optical disk drive apparatus 204 reports shortage information which indicates that the remaining amount of the first spare area 102 is less than a predetermined size (e.g., 1 MB) (step S409).

In response to the command issued from the system control apparatus 200 in step S409, the remaining spare area amount detection section 233 calculates the remaining amount of the first spare area 102 (e.g., the number of spare sectors in the first spare area 102 that are available for replacement) based on the information of the replacement entry stored in the defect management information memory 241. If the remaining amount is less than the predetermined size, the remaining spare area amount detection section 233 instructs the remaining spare amount reporting section 231 to report the shortage information to the system control apparatus 200. The remaining spare amount reporting section 231 reports the shortage information to the system control apparatus 200 (step S410).

In the example illustrated in FIG. 1, the defective sector 118 is detected when recording data in the data area 105, and the #2 spare sector 111 is used to replace the defective sector 118. Therefore, the #3 spare sector 110 is the only spare sector in the first spare area 102 that is available for replacement. Then, if another defective sector occurs, the first spare area 102 would be exhausted, whereby no more replacement operation can be done. Therefore, the remaining spare amount reporting section 231 reports the shortage information to the system control apparatus 200.

In order to enlarge spare area, it is necessary to update the file entry area 116, the location information 133 indicating the location of the second spare area 108, and the space bit map area 113.

The system control apparatus 200 recognizes the unallocated area 107 based on the data reproduced from the space bit map area 113 and determines the area to be reserved as an additional spare area (i.e., the area where the second spare area 108 is allocated). The system control apparatus 200 updates the data stored in the file structure memory 221 in order to register the extended spare area, and updates the data stored in the bit map memory 222 so that the sectors of the area where the second spare area 108 is to be allocated are indicated as "allocated".

The system control apparatus 200 issues a Write command and transmits the data for the file entry area 116 stored in the file structure memory 221 to the optical disk drive apparatus 204 (step S411).

The optical disk drive apparatus 204 updates the file entry area 116 by recording the data transmitted from the system control apparatus 200 in the file entry area 116 (step S412).

The system control apparatus 200 issues an Alloc Spare command and transmits the data for updating the second spare area location information 133 to the optical disk drive apparatus 204 (step S413).

The optical disk drive apparatus 204 updates the second spare area location information 133 stored in the defect management information memory 241 based on the data transmitted from the system control apparatus 200 (step S414).

Through the operations of steps S412 and S414, the second spare area 108 becomes available as an added spare area in the optical disk drive apparatus 204. In the example illustrated in FIG. 1, the second spare area 108 includes #4 spare sector 122 to #6 spare sector 120. The number of spare sectors included in the second spare area 108 is not limited to 3. The second spare area 108 may include any number of spare sectors.

The file structure operation section 211 transmits the data for the space bit map area 113 stored in the file structure memory 221 to the optical disk drive apparatus 204 (step S415).

The data write control section 235 updates the space bit map area 113 by recording the data transmitted from the system control apparatus 200 in the space bit map area 113 (step S416).

The defective sector operation section 234 records in the defect management information area 101 the data which is stored in the defect management information memory 241 by the method described above in the procedure of the exemplary format operation (step S417).

As described above, in the data write operation for recording a file on the optical disk, it is possible to extend the first spare area 102 (i.e., to additionally allocate the second spare area 108) based on the status of consumption of the first spare area 102. Thus, it is possible to increase the reliability of data recording without performing an initialization operation.

When recording a file on the optical disk, the file structure operation section 211 may determine locations where data can be recorded, sequentially starting from a sector with the least LSN. In this way, data is recorded preferentially from the inner periphery of the optical disk, so that data is less likely to be recorded in an area to which the second spare area is extended, whereby it is possible to easily extend the spare area without moving files.

While an optical disk including the first spare area has been described in the above embodiment, the present invention may alternatively be applied to an optical disk in which the first spare area does not exist. For example, it is possible not to allocate the second spare area when there is no defective sector, while additionally allocating the second spare area when there occurs a defective sector. With such a defect management method, it is possible to obtain effects similar to those realized in the above-described embodiment.

Next, a method for determining whether or not it is necessary to extend the first spare area 102 will be described with reference to FIGS. 1, 2 and 6A-6C. This method may alternatively be applied to a determination of whether or not it is necessary to extend the second spare area 108.

Figure 6A:
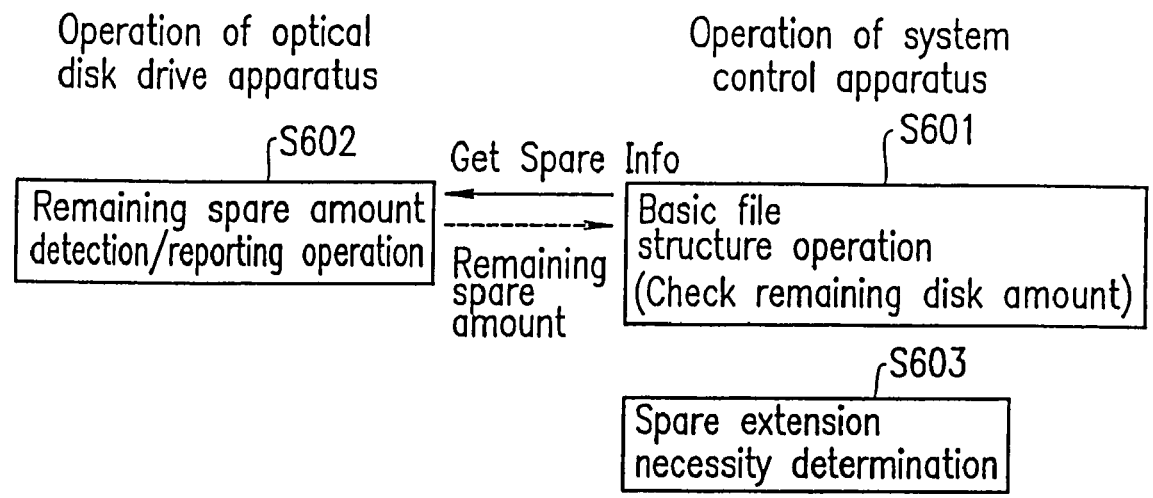
FIGS. 6A-6C are protocol charts illustrating an procedure of an operation of determining whether or not it is necessary to extend a first spare area 102.
Figure 6B:
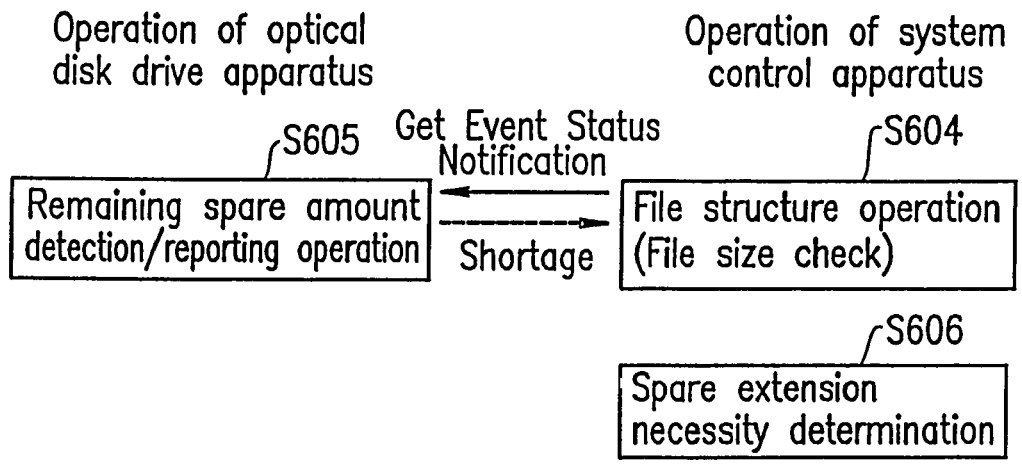
Figure 6C:
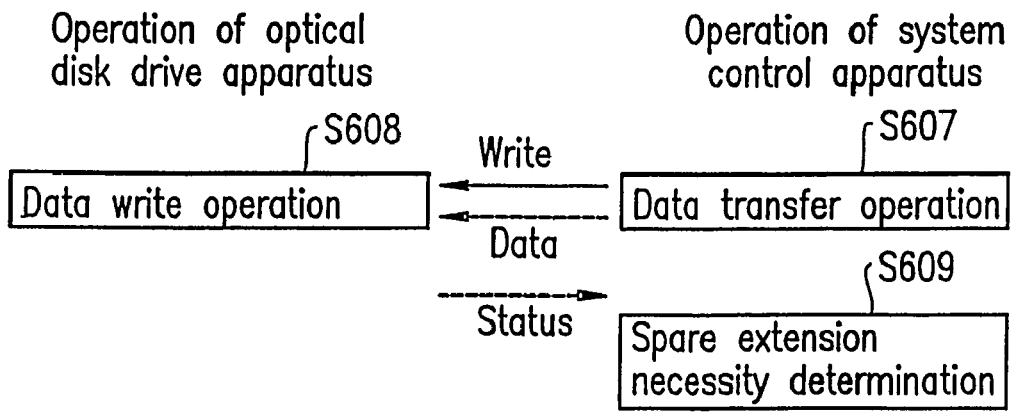

FIGS. 6A-6C are protocol charts illustrating an procedure of an operation of determining whether or not it is necessary to extend the first spare area 102. This operation is performed by the optical disk drive apparatus 204 and the system control apparatus 200.

FIG. 6A illustrates an operation performed when the optical disk is inserted into the optical disk drive apparatus 204.

As described above, when the optical disk is inserted into the optical disk drive apparatus 204, the file structure operation section 211 reproduces the volume structure area 103 and the basic file structure area 104 and instructs the data read control section 236 to transmit the reproduced data to the file structure memory 221 (step S402 in FIG. 5).

The file structure operation section 211 analyzes the basic file structure based on the data transmitted to the file structure memory 221. As a result, the file structure operation section 211 calculates the size of area in the logical volume space 100b that is available for recording based on the data reproduced from the space bit map area 113. The size of area is calculated by, for example, summing the number of sectors in the unallocated area 107. The calculation result is stored in the spare area information memory 224.

The file structure operation section 211 issues a Get Spare Info command to the optical disk drive apparatus 204 in order to inquire as to the remaining amount of the first spare area 102 (step S601).

The remaining spare area amount detection section 233 calculates the remaining amount of the first spare area 102 (e.g., the number of spare sectors that are available for replacement) by the method as described above in the description of the format operation, and the remaining spare amount reporting section 231 reports the calculation result to the system control apparatus 200 (step S602). The information indicating the remaining amount of the first spare area 102 is stored in the spare area information memory 224.

The spare area extension determination section 215 calculates the ratio (A/B) of the remaining amount (A) of the first spare area 102 with respect to the size of area (B) in the logical volume space 100b that is available for recording, and determines that the first spare area 102 should be extended if the ratio (A/B) is less than a predetermined ratio (e.g., 0.5%) (step S603).

The determination operation illustrated in FIG. 6A is performed upon insertion of the optical disk before data is recorded thereon. The determination operation has features that the procedure of the determination operation is simple and that the implementation of the determination operation is easy.

FIG. 6B illustrates an operation performed when recording a file. In the operation illustrated in FIG. 6B, when a file is recorded on the optical disk, it is determined before recording the file whether or not it is necessary to extend the first spare area 102. Such a determination is performed based on the size of the data to be recorded and the remaining amount of the first spare area 102.

The file structure operation section 211 stores the data to be recorded on the optical disk in the data memory 223 and calculates the size of the data. The calculation result is stored in the spare area information memory 224.

The file structure operation section 211 issues a Get Event Status Notification command to the optical disk drive apparatus 204 in order to inquire as to the status of consumption of the first spare area 102 (step S604).

The remaining spare area amount detection section 233 calculates the remaining amount of the first spare area 102 by the method described above in the description of the format operation. If the remaining amount of the first spare area 102 is less than a predetermined size (e.g., 1 MB), the remaining spare amount reporting section 231 reports shortage information indicating the shortage of the first spare area 102 to the system control apparatus 200 (step S605). The shortage information is stored in the spare area information memory 224.

The spare area extension determination section 215 determines whether or not the first spare area 102 should be extended based on the size of the data to be recorded and the shortage information (step S606). For example, when the size of the data to be recorded is greater than the remaining amount of the first spare area 102, the spare area extension determination section 215 determines that the first spare area 102 should be extended.

With the determination operation illustrated in FIG. 6B, it is possible to allocate the spare area according to the size of the file to be recorded. Therefore, the operation has features that it is possible to reasonably ensure the reliability of data recording, assuming that the frequency of occurrence of defective sectors is statistically substantially constant.

FIG. 6C illustrates an operation performed in data transmission.

When a file is recorded on the optical disk, the data of the file is divided into a plurality of data portions. For example, when data having a size of 1 MB is recorded on the optical disk, the data is divided into a plurality of data portions each having a size of 32 kB.

A Write command is issued for each of the data portions. As a result, each of the data portions is transmitted from the system control apparatus 200 to the optical disk drive apparatus 204.

In the operation illustrated in FIG. 6C, it is determined whether or not the first spare area 102 should be extended each time a data portion is transmitted.

The file structure operation section 211 issues a Write command to the optical disk drive apparatus 204 for each of the data portions (step S607).

The data write control section 235 records the data portion transmitted from the system control apparatus 200 in a predetermined sector, and when a defective sector is detected, the defective sector operation section 234 performs a replacement operation for the defective sector.

When the recording operation for the data portions is completed, the remaining spare amount reporting section 231 reports Status information indicating the execution result of the Write command to the system control apparatus 200 (step S608). The Status information includes information indicating the number of defective sectors which have occurred during the data transmission.

The command status operation section 216 receives the Status information from the optical disk drive apparatus 204, and stores the information indicating the number of defective sectors which have occurred during the data transmission in the spare area information memory 224. The spare area extension determination section 215 determines whether or not any defective sector has occurred during the data transmission based on the information stored in the spare area information memory 224. If any defective sector has occurred, the spare area extension determination section 215 determines that the first spare area 102 should be extended by the number of defective sectors (step S609).

The determination operation illustrated in FIG. 6C has a feature that it is possible to effectively utilize the area of the optical disk that is available for recording. This is because the spare area can be extended each time a defective sector is detected, whereby the size of the area which is allocated as a spare area can be reduced.

In the above-described determination operation, the report by the remaining spare amount reporting section 231 of the remaining amount of the spare area to the system control apparatus 200 may be done in any form. For example, the remaining amount of the spare area may be represented in the form of flags or in the form of a remaining amount value.

Next, a method for extending the first spare area 102 and the second spare area 108 will now be described in detail with reference to FIGS. 1, 2 and 7.

FIG. 7 is a protocol chart illustrating a procedure of an operation of extending the first spare area 102 and a second spare area 108. This operation is performed by the optical disk drive apparatus 204 and the system control apparatus 200.

When it is determined by the spare area extension determination section 215 that the first spare area 102 (or the second spare area 108) should be extended, the spare extension area detection section 212 determines the area to be allocated as an additional spare area based on the second spare area location information 143 stored in the file structure memory 221 (step S701).

When allocating the second spare area 108 for the first time, the second spare area 108 may be allocated in any area in the logical volume space 100b. However, when contiguous data of a large file size such as audio video data (AV data) is recorded on the optical disk, it is necessary to allocate a larger contiguous unallocated area 107. Therefore, when allocating the second spare area 108 for the first time, the second spare area 108 is desirably allocated starting from the end of the logical volume space 100a.

The spare sectors included in the second spare area 108 are used in an order such that spare sectors assigned with larger LSNs are used before those assigned with smaller LSNs. In other words, the defective sectors are replaced by the spare sectors in descending order of the LSNs assigned to the spare sectors.

When the second spare area 108 is extended, the second spare area 108 is extended in a direction along which the LSN decreases. When the second spare area 108 is extended, the area allocated as an additional spare area may be an area contiguous with the second spare area 108 or an area separated from the second spare area 108.

The file structure operation section 211 determines whether or not the area to be allocated as an additional spare area is unallocated based on the space bit map information stored in the bit map memory 222 (step S702). If the area is unallocated, the process proceeds to step S704, and if not, the process proceeds to step S704 via step S703. This is because when the area to be allocated as an additional spare area is not unallocated (i.e., when data is already recorded in the area), it is necessary to move the data to another location before the area can be used as an additional spare area.

The file moving operation section 213 performs a file moving operation (step S703). In particular, the file moving operation section 213 examines the file structure of all the files on the optical disk to determine the data recorded in the area. Then, the file moving operation section 213 uses the space bit map information to search for an area to which it is possible to move the data which has already been recorded in the area to be allocated as an additional spare area, move the data according to the attribute of the data, and update the information of the file structure managing the moved data (step S703). In this way, an additional spare area is allocated.

Although not shown in FIG. 7, the spare extension area allocation section 214 instructs the optical disk drive apparatus 204 to examine whether or not there is any defective sector in the area to be allocated as an additional spare area. When there is any defective sector in the area, the spare extension area allocation section 214 instructs the spare extension area detection section 212 to increase the size of the additional area, and returns the control of the process to step S701. Thus, the process is performed again from step S701.

When there is no defective sector in the area to be allocated as an additional spare area, the spare extension area allocation section 214 issues a Write command and transmits data for updating the file entry area 116 stored in the file structure memory 221 (step S704).

The data write control section 235 records the data transmitted from the system control apparatus 200 in the file entry area 116 (step S705). As a result, the second spare area location information 143 recorded in the file entry area 116 is updated.

The spare extension area issue section 217 issues an instruction to extend the spare area by using an Alloc Spare command. Specifically, the spare extension area issue section 217 issues an Alloc Spare command and transmits data for updating the second spare area location information 133 to the optical disk drive apparatus 204 (step S706).

The data write control section 235 updates the second spare area location information 133 stored in the defect management information memory 241 based on the data transmitted from the system control apparatus 200 (step S707).

Thus, when any data is recorded in the area to be allocated as an additional spare area, the data recorded in the area to be allocated as an additional spare area is moved to another area by analyzing the information of the file structure. In this way, the spare area can be extended even when data has been recorded in an area into which a spare area is to be extended.

When there is any defective sector in an area to be allocated as an additional spare area, the size of the additional spare area is increased according to the number of the defective sectors. Thus, it is possible to reliably ensure a spare area of a required size.

Next, countermeasures which can be taken when the second spare area location information 143 managed by the system control apparatus 200 and the second spare area location information 133 managed by the optical disk drive apparatus 204 are not consistent with each other and a method for recovering the inconsistency between the information 143 and 133 will be described.

In FIG. 1, it is assumed that sector a (sector 117) in the data area 105 has been detected as a defective sector, and the sector 117 has been replaced by the #4 spare sector 122. In such a case, the #4 spare sector 122 is specified by two LSNs. The first LSN is one of the LSNs which are sequentially assigned in the volume space 10a starting from the beginning of the volume space 10a (herein, LSN=n). The second LSN is the LSN which is assigned to the replaced defective sector 117 (herein, LSN=m).

When the second spare area location information 143 managed by the system control apparatus 200 and the second spare area location information 133 managed by the optical disk drive apparatus 204 are not consistent with each other, the system control apparatus 200 may possibly issue a Write command to the sector whose LSN is n. When the recording operation is performed, the data recorded in the #4 spare sector 122 is overwritten. As a result, data of the file named "File-a" is destroyed.

In order to avoid the fatal incident of destroying the data of a file, the optical disk drive apparatus 204 recognizes the sectors included in the second spare area 108 by referencing the second spare area location information 133. When it is requested to record data in a sector included in the second spare area 108, the optical disk drive apparatus 204 reports to the system control apparatus 200 error information indicating prohibition of a recording request to the second spare area 108, without performing a recording operation corresponding to the request. In this way, it is possible to prevent data of a file from being destroyed due to the inconsistency between the second spare area location information 133 and the second spare area location information 143.

When the system control apparatus 200 receives the error information, the system control apparatus 200 preferably performs an operation of making the second spare area location information 133 consistent with the second spare area location information 143. For example, as described above in the description of the format operation, the system control apparatus 200 may obtain the second spare area location information 133 based on the information reproduced from the defect management information area 101, and update the second spare area location information 143 recorded in the file entry area 116 based on the location information 133, while updating the space bit map stored in the bit map memory 222 based on the location information 143.

Before updating the second spare area location information 143, it is preferred to confirm that an area which is newly registered in the file entry as the second spare area 108 is not being used for any purpose other than a spare area, as described above in the description of the operation of extending a spare area. Such confirmation can be done by examining all the file structures.

The above-described example where the location information 133 and 143 are not consistent with each other is an exemplary case where the size of the second spare area 108 recorded in the defect management information area 101 is greater than the size of the second spare area 108 recorded in the file entry area 116.

It is possible to detect the inconsistency between the location information 133 and 143 and to make the location information 133 and 143 consistent with each other also when the size of the second spare area 108 recorded in the defect management information area 101 is less than the size of the second spare area 108 recorded in the file entry area 116.

For example, as a start-up operation for the system control apparatus 200, the system control apparatus 200 may obtain the location information 133 based on the data reproduced from the basic file structure area 104, while obtaining the location information 143 by making an inquiry for the spare area information. By comparing the location information 133 and the location information 143 with each other, it is possible to detect the inconsistency between the location information 133 and 143.

When the inconsistency between the location information 133 and 143 is detected, the system control apparatus 200 instructs the optical disk drive apparatus 204 to correctly update the second spare area location information by using an Alloc Spare command.

Embodiment 2

In Embodiment 2, an example where the second spare area 108 is allocated outside the volume space 100a will be described.

In Embodiment 2, an information recording/reproduction system 1b is used. The configuration of the information recording/reproduction system 1b is the same as that of the information recording/reproduction system 1a illustrated in FIG. 2, and thus will not be described below.

Each of the system control apparatus 200 and the optical disk drive apparatus 204 is connected to the I/O bus 203 via a SCSI or ATAPI interface. Commands and data are exchanged between the system control apparatus 200 and the optical disk drive apparatus 204.

The system control apparatus 200 and the optical disk drive apparatus 204 may be an integrally-formed single apparatus. In such a case, the interface between the system control apparatus 200 and the optical disk drive apparatus 204 may be a simplified dedicated interface.

Figure 8:
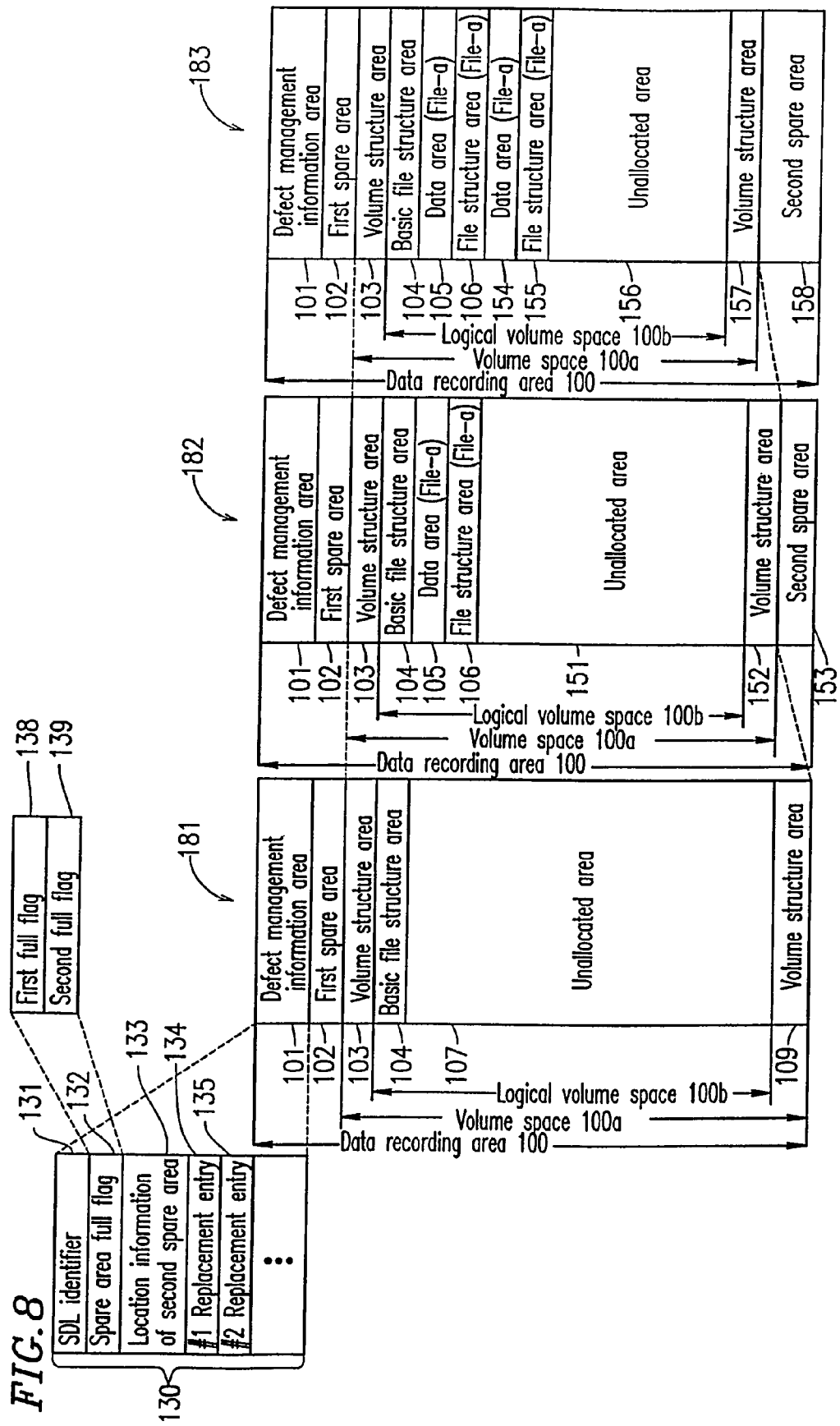
FIG. 8 is a diagram illustrating a structure of the data recording area 100 of an optical disk according to an embodiment of the present invention.

FIG. 8 is a diagram illustrating a structure of the data recording area 100 of an optical disk according to an embodiment of the present invention. In FIG. 8, reference numeral 181 denotes the state of the optical disk after the format operation, reference numeral 182 denotes the state of the optical disk after a data write operation of recording a file named "File-a" on the optical disk, and reference numeral 183 denotes the state of the optical disk after a data write operation of recording a file named "File-b" on the optical disk.

Figure 9:
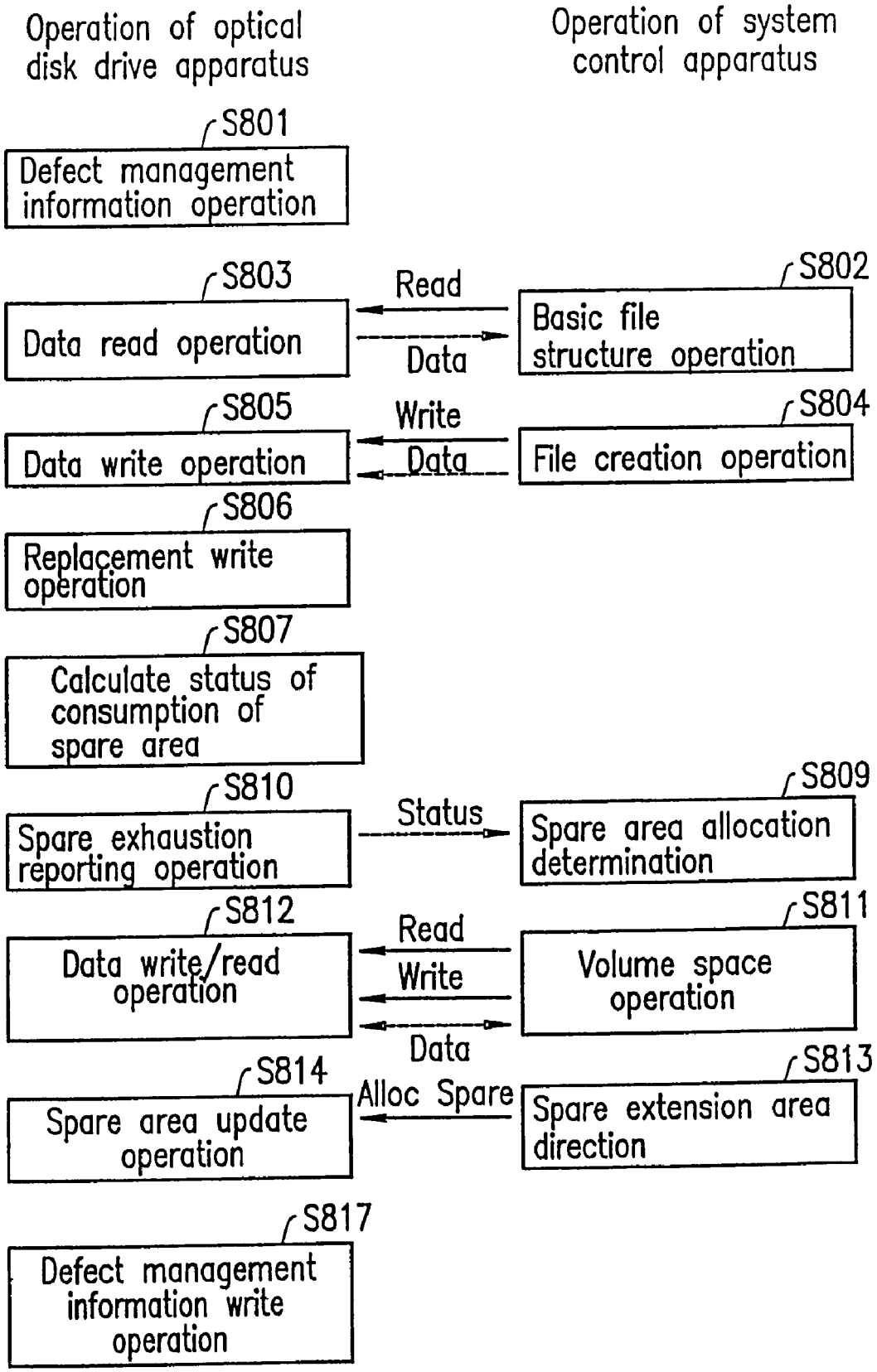
FIG. 9 is a protocol chart illustrating a procedure of a data write operation for recording a file on an optical disk.

FIG. 9 is a protocol chart illustrating a data write operation for recording a file on an optical disk.

The data write operation illustrated in FIG. 9 includes: step S807 of calculating the status of consumption of a spare area; step S809 of determining additional allocation of a spare area based on the calculated status of consumption; step S811 of making a part of the volume space available as a spare area; and step S817 of registering the area made available as a spare area. These steps are the same as those in the data write operation described in Embodiment 1.

A data write operation of recording a file (File-a) on the optical disk when the optical disk is in the state denoted by reference numeral 181 in FIG. 8 will now be described. Through this data write operation, the state of the optical disk transitions from the state denoted by reference numeral 181 in FIG. 8 to the state denoted by reference numeral 182 in FIG. 8. Through this data write operation, a second spare area 153 is newly allocated. The state of the optical disk denoted by reference numeral 181 is the same as that illustrated in FIG. 4.

When the optical disk is inserted into the optical disk drive apparatus 204, as a start-up operation for the optical disk drive apparatus 204, the remaining spare area amount detection section 233 obtains information which indicates the status of consumption of the first spare area 102 (step S801).

For example, the remaining spare area amount detection section 233 may obtain information indicating the status of consumption of the first spare area 102 by referencing the spare area full flag 132. The first full flag 138 being set indicates that all of the spare sectors in the first spare area 102 are used (i.e., no spare sector is available for replacement in the first spare area 102).

In the first spare area 102, the spare sectors are sequentially used starting from the spare sector that is assigned the largest physical sector number. In other words, the defective sectors are replaced by the spare sectors in descending order of the physical sector numbers assigned to the spare sectors. Such an order in which the spare sectors are used is also used in the second spare area 108.

The remaining spare area amount detection section 233 may alternatively retrieve one of the replacement entries recorded in the defect management information area 101 that has the smallest location information (e.g., the physical sector number) of a spare sector so as to obtain the information indicating the status of consumption of the first spare area 102 based on the location information of the spare sector in the retrieved replacement entry. Thus, the remaining spare area amount detection section 233 can know the amount of spare sector available in the first spare area 102 based on the location information of the spare sector in the retrieved replacement entry and the size of the first spare area 102. In the example illustrated in FIG. 8, the size of the first spare area 102 is predetermined. Therefore, the remaining spare area amount detection section 233 can know the amount of spare sectors available in the first spare area 102 based on the location information of the spare sector in the retrieved replacement entry.

Thus, the information indicating the status of consumption of the first spare area 102 may be either the first full flag 138 or the amount of spare sector available in the first spare area 102.

As a start-up operation for the system control apparatus 200, the file structure operation section 211 issues a Read command to the optical disk drive apparatus 204 (step S802).

The data read control section 236 reproduces data recorded in the volume structure area 103 and the basic file structure area 104 according to the address specified by the Read command, and returns the reproduced data to the system control apparatus 200 (step S803).

The file structure operation section 211 receives the data reproduced from the optical disk drive apparatus 204, and analyzes the basic file structure based on the reproduced data (step S802).

The file structure operation section 211 issues a Write command and transmits data of the file (File-a) to the optical disk drive apparatus 204 (step S804).

The data write control section 235 records the data transmitted from the system control apparatus 200 in the data area 105 and the file structure area 106 (step S805).

When any defective sector is detected in the data write operation in step S805, the defective sector operation section 234 performs a replacement operation of replacing the defective sector by a spare sector in the first spare area 102 (step S806).

The remaining spare area amount detection section 233 obtains information indicating the status of consumption of the first spare area 102 based on the information of the defect management information memory 241 which has been updated in step S806 (step S807).

When the first spare area 102 has been exhausted, the remaining spare amount reporting section 231 notifies the system control apparatus 200 of the information indicating that the first spare area 102 has been exhausted (step S810). Such a notification can be made by, for example, by returning to the system control apparatus 200 "Recovered Error" as Status information to the Write command transmitted in step S804.

The spare area extension determination section 215 recognizes the exhaustion of the first spare area 102 via the command status operation section 216, and determines to allocate the second spare area 153 in an area in the outermost periphery of the data recording area by reducing the volume space 10a (step S809).

Since the second spare area is allocated in an area in the data recording area 100 whose PSN is largest, the second spare area location information 133 is represented only by the PSN of the first sector included in the second spare area 108, for example.

The spare extension area allocation section 214 instructs the optical disk drive apparatus 204 to update the volume structure areas 103 and 109 and the basic file structure area 104 by using a Read command and a Write command in order to allocate an area for allocating the second spare area 153 in the area on the outer periphery side following the volume space 10a by reducing the volume space 10a (step S811).

The data write control section 235 and the data read control section 236 update the volume structure areas 103 and 109 and the basic file structure area 104 according to these commands (step S812).

The details of the update operation illustrated in steps S811 and S812 will be described later with reference to FIG. 11.

The spare extension area issue section 217 instructs the optical disk drive apparatus 204 to register the newly-allocated area as the second spare area 153 by using an Alloc Spare command (step S813). A Format Unit command may alternatively be used instead of an Alloc Spare command.

The spare area allocation section 232 recognizes that a second spare area has not been allocated by using the second spare area location information 133 stored in the defect management information memory 241, updates the second spare area location information 133 stored in the defect management information memory 241 so as to newly allocate the second spare area 153 based on an Alloc Spare command (or a Format Unit command), and resets the second full flag 139 for the second spare area 153 (step S814). Since the second spare area 153 is allocated outside the volume space, the sectors in the second spare area 153 do not have LSNs.

The defective sector operation section 234 records the updated defect management information 130 stored in the defect management information memory 241 in the defect management information area 101 (step S817). Such recording is performed immediately after step S813 or when there is no data recording instruction from the system control apparatus 200 for a predetermined period of time (e.g., 5 seconds).

Thus, the optical disk drive apparatus 204 and the system control apparatus 200 cooperate with each other to additionally allocate the second spare area 153, whereby it is possible to increase the reliability of data recording.

The second spare area 153 may be allocated in an area separated from the first spare area 102 or in an area contiguous with the first spare area 102.

For example, the second spare area 153 is allocated in an area including a sector which is assigned a physical sector number that is larger than that of any sector in the first spare area 102. When the second spare area 153 includes a plurality of spare sectors, the defective sector is replaced by a corresponding one of the spare sectors in descending order of the physical sector numbers assigned to the spare sectors.

Moreover, as indicated by reference numeral 182 in FIG. 8, the volume space 10a is re-configured to include the volume structure area 103, the basic file structure area 104, the data area (File-a) 105, the file structure area (File-a) 106, an unallocated area 151 and a volume structure area 152, while holding the files that have already been recorded on the optical disk.

In this way, the volume space 100a is re-configured so that the second spare area 153 is allocated outside the volume space 10a. This eliminates the need for the operation for avoiding the inconsistency between the second spare area location information 133 recorded in the defect management information area 101 and the second spare area location information 143 recorded in the file entry area 116, as that described in Embodiment 1 above.

Moreover, in Embodiment 2, it is not necessary to record the location information of the second spare area in the basic file structure area 104. This eliminates the need to provide a special data structure for the file system, whereby when reusing an optical disk on which a second spare area has once been allocated, it is possible to reuse the optical disk, after a logical format, not only for the file system described in the present embodiment but also for a more generally-used FAT file system which is used in, e.g., MS-DOS.

The size of the second spare area 153 may be determined according to the status of consumption of the first spare area 102. For example, if in step S810 the remaining spare amount reporting section 231 reports the exhaustion of the first spare area 102 to the system control apparatus 200 when the size of the spare sector in the first spare area 102 available for replacement has decreased to be 1 MB or less, then the second spare area 153 may be allocated by blocks of 1 MB.

When ECC (Error Correction Code) is arranged by blocks of 16 sectors, one ECC block includes 16 sectors. Then, the replacement of defective sectors may be performed by ECC blocks, rather than by blocks of sectors. By performing the replacement operation by ECC blocks, it is no longer necessary to re-calculate ECCs, whereby the recording/reproduction system can be simplified.

Preferably, the smallest unit by which the second spare area can be extended is predetermined. For example, it may be determined to extend the second spare area by blocks of 32 ECC blocks (1 MB). In such a case, as compared to a case where the spare area is extended by blocks of 2 to 3 sectors, it is possible to reduce the frequency of exhaustion of spare area. Moreover, by extending the second spare area by ECC blocks, it is possible to facilitate the replacement of defective sectors by ECC blocks.

The descriptors defined in the ECMA167 standard which are recorded in the volume structure area 103, the basic file structure area 104, the file structure area (File-a) 106 and the volume structure area 152 may be recorded on the optical disk in a dispersed arrangement.

A data write operation of recording a file (File-b) on the optical disk when the optical disk is in the state denoted by reference numeral 182 in FIG. 8 will now be described. Through this data write operation, the state of the optical disk transitions from the state denoted by reference numeral 182 in FIG. 8 to the state denoted by reference numeral 183 in FIG. 8. Through this data write operation, an additional spare area is allocated in an area which is contiguous with the second spare area 153 which has already been allocated. As a result, a second spare area 158 is allocated which is obtained by extending the second spare area 153.

Thus, the second spare area 153 can be extended in a direction along which the physical sector number decreases.

The data write operation of recording the file (File-b) on the optical disk is also performed according to steps S801-S817 illustrated in FIG. 9.

The operations of steps S801-S803 are the same as those described above, and thus will not be described below.

The file structure operation section 211 issues a Write command and transmits data of the file (File-b) to the optical disk drive apparatus 204 (step S804).

The data write control section 235 records the data transmitted from the system control apparatus 200 in a data area 154 and a file structure area 155 (step S805).

When any defective sector is detected in the data write operation in step S805, the defective sector operation section 234 performs a replacement operation for replacing the defective sector by the spare sectors in the second spare area 153 (step S806). A replacement entry indicating that the defective sector has been replaced by a spare sector is generated, and the replacement entry is stored in the defect management information memory 241 before it is recorded in the defect management information area 101.

If all of the spare sectors in the second spare area 153 have been consumed, the defective sector operation section 234 sets the second full flag 139 of the spare area full flag 132.

The remaining spare area amount detection section 233 obtains information indicating the status of consumption of the second spare area 153 (step S807). The method for obtaining the information indicating the status of consumption of the second spare area 153 is similar to the above-described method for obtaining the information indicating the status of consumption of the first spare area 102.

When the second spare area 153 is exhausted, the remaining spare amount reporting section 231 notifies the system control apparatus 200 of the information indicating that the second spare area 153 has been exhausted (step S810).

The spare area extension determination section 215 recognizes the exhaustion of the second spare area 153 via the command status operation section 216, and determines to newly allocate an additional spare area in an area which is contiguous with the second spare area 153 (step S809).

The spare extension area allocation section 214 instructs the optical disk drive apparatus 204 to update the volume structure areas 103 and 152 and the basic file structure area 104 by using a Read command and a Write command in order to allocate an area for allocating the additional spare area by reducing the volume space 10a (step S811).

The data write control section 235 and the data read control section 236 update the volume structure areas 103 and 152 and the basic file structure area 104 according to these commands (step S812).

The spare extension area issue section 217 instructs the optical disk drive apparatus 204 to register the newly-allocated area and the second spare area 153 as the new second spare area 158 (step S813).

The spare area allocation section 232 recognizes that the second spare area 153 has been allocated by using the second spare area location information 133 stored in the defect management information memory 241, and checks the second full flag 139. Then, the spare area allocation section 232 updates the second spare area location information 133 stored in the defect management information memory 241 so as to extend the second spare area in a direction along which the physical sector number decreases, and when the second full flag 139 for the second spare area 153 is set, resets the second full flag 139 (step S814). Thus, it is possible to use a spare sector available for replacement in the second spare area 158.

The defective sector operation section 234 records the updated defect management information 130 stored in the defect management information memory 241 in the defect management information area 101 (step S817). Such recording is performed when there is no data recording instruction from the system control apparatus 200 for a predetermined period of time (e.g., 5 seconds).

Thus, by the cooperation of the optical disk drive apparatus 204 and the system control apparatus 200, it is possible to extend the second spare area according to the frequency of occurrence of defective sectors.

Figure 10:
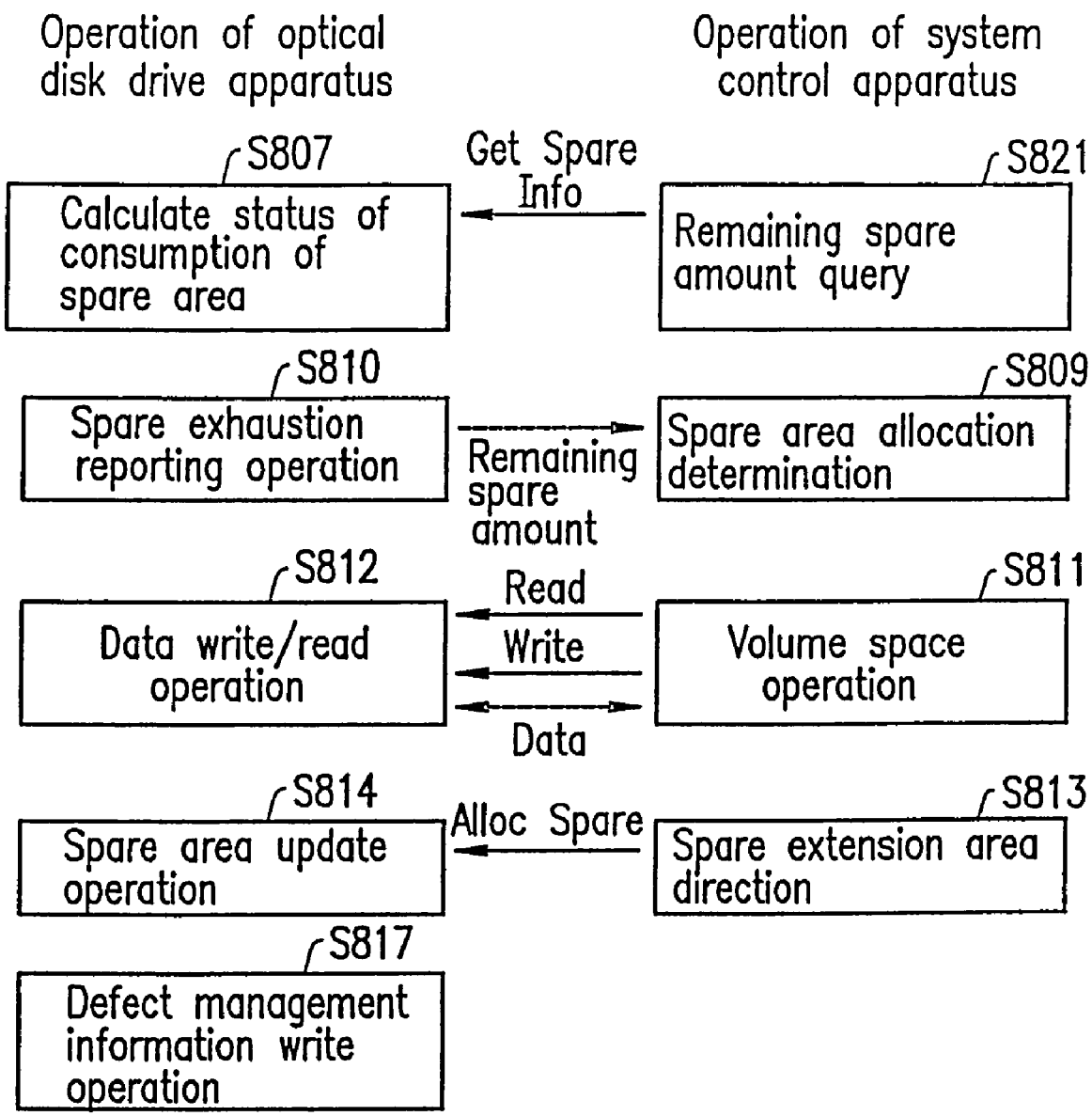
FIG. 10 is a protocol chart illustrating a procedure of an operation which is performed when an optical disk is inserted into an optical disk drive apparatus.

FIG. 10 is a protocol chart illustrating a procedure of an operation which is performed when an optical disk is inserted into an optical disk drive apparatus. In this procedure, the status of consumption of the spare area is examined upon insertion of the optical disk. As a result, whether or not it is necessary to allocate an additional spare area is determined according to the status of consumption of the spare area.

In the following description made in connection with FIG. 10, the term "spare area" refers to the "first spare area 102", the "second spare area 153" or the "second spare area 158" illustrated in FIG. 8.

The file structure operation section 211 issues a Get Spare Info command to the optical disk drive apparatus 204 in order to inquire as to the status of consumption of the spare area (step S821). The file structure operation section 211 may alternatively use a Read DVD Structure command instead of a Get Spare Info command.

The remaining spare area amount detection section 233 obtains information indicating the status of consumption of the spare area (step S807). The information indicating the status of consumption of the spare area includes, for example, information indicating the size of area in the spare area that is available for replacement.

The remaining spare amount reporting section 231 reports the information indicating the status of consumption of the spare area to the system control apparatus 200 (step S810).

The spare area extension determination section 215 determines whether or not to allocate an additional spare area according to the status of consumption of the spare area. For example, when the size of area in the spare area that is available for replacement is less than or equal to a predetermined size (e.g., 1 MB), the spare area extension determination section 215 determines to newly allocate an additional spare area (step S809).

The operations of steps S811-S817 illustrated in FIG. 10 are the same as those of steps S811-S817 illustrated in FIG. 9, and thus will not be described below.

Thus, by the cooperation of the optical disk drive apparatus 204 and the system control apparatus 200, it is possible, before recording data, to allocate a spare area having an optimal size according to the status of consumption of the spare area.

An operation of updating the volume structure areas 103 and 109 and the basic file structure area 104 will now be described in detail with reference to FIG. 11. The update operation is performed by the spare extension area allocation section 214. In FIG. 11, each reference numeral that starts with "S" denotes a step in the update operation.

Figure 11:
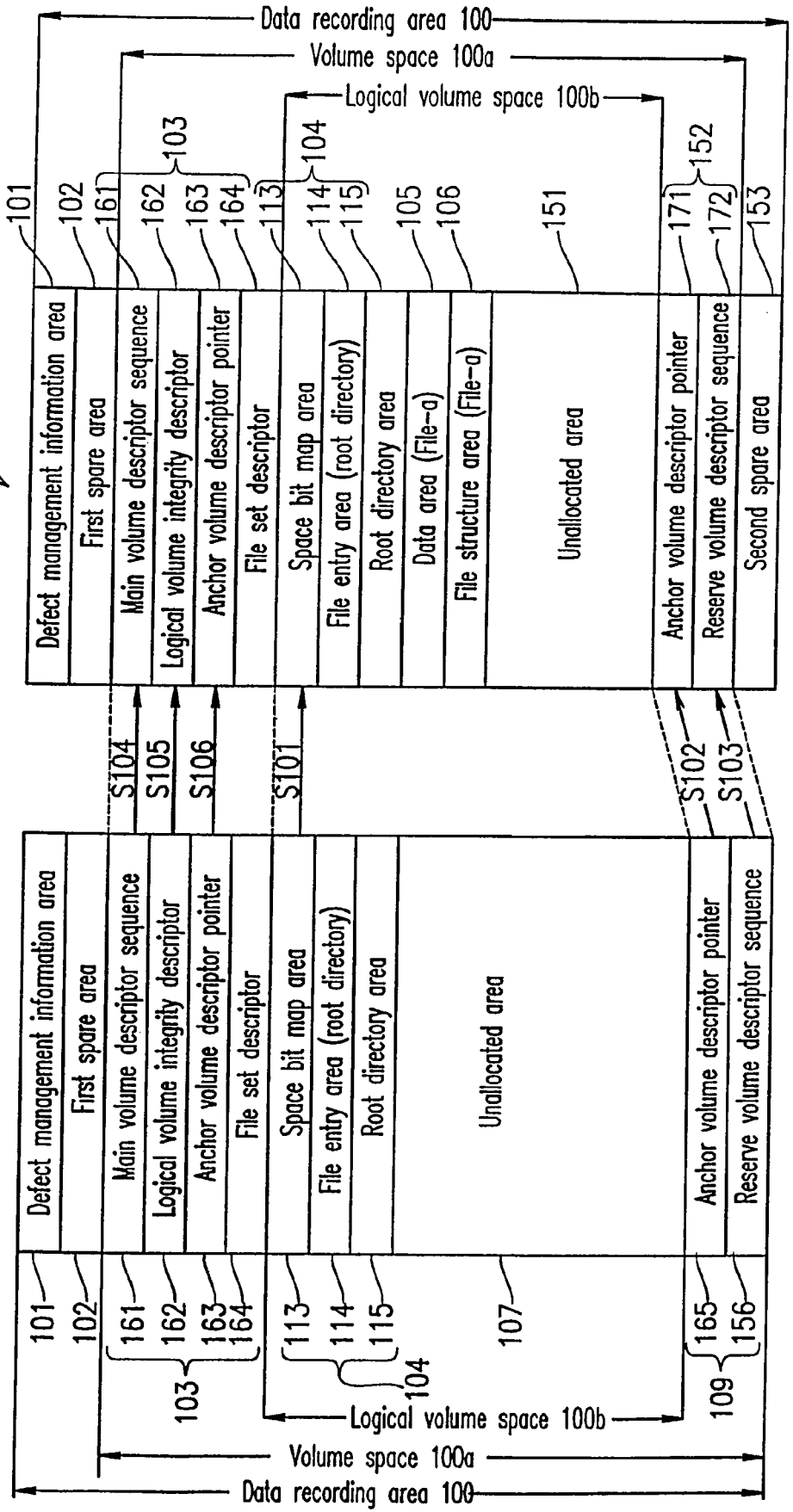
FIG. 11 is a diagram illustrating an operation of updating volume structure areas 103 and 109 and a basic file structure area 104.
Figure 12:
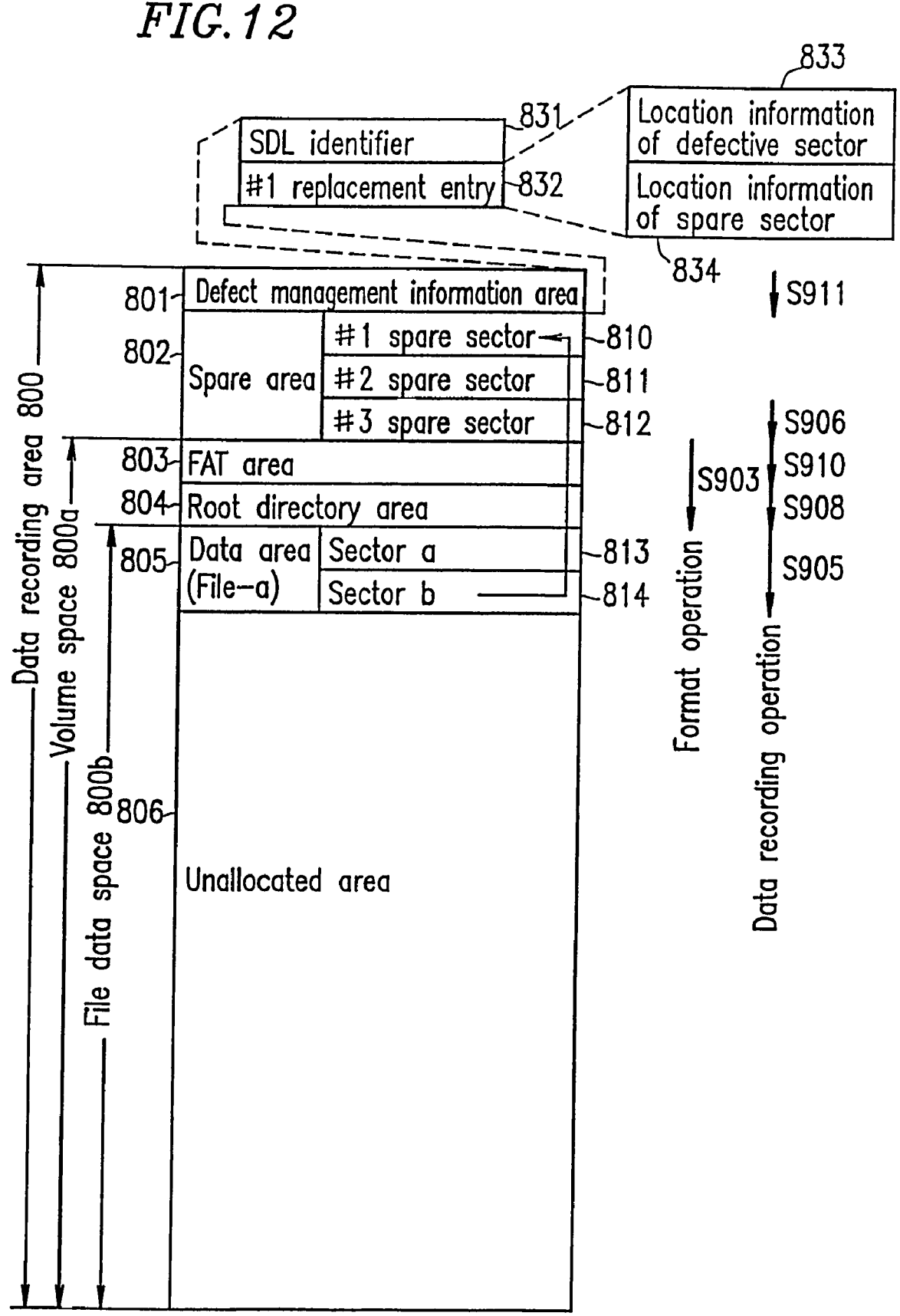
FIG. 12 is a diagram illustrating a structure of a data recording area 800 of a conventional optical disk.
Figure 13:
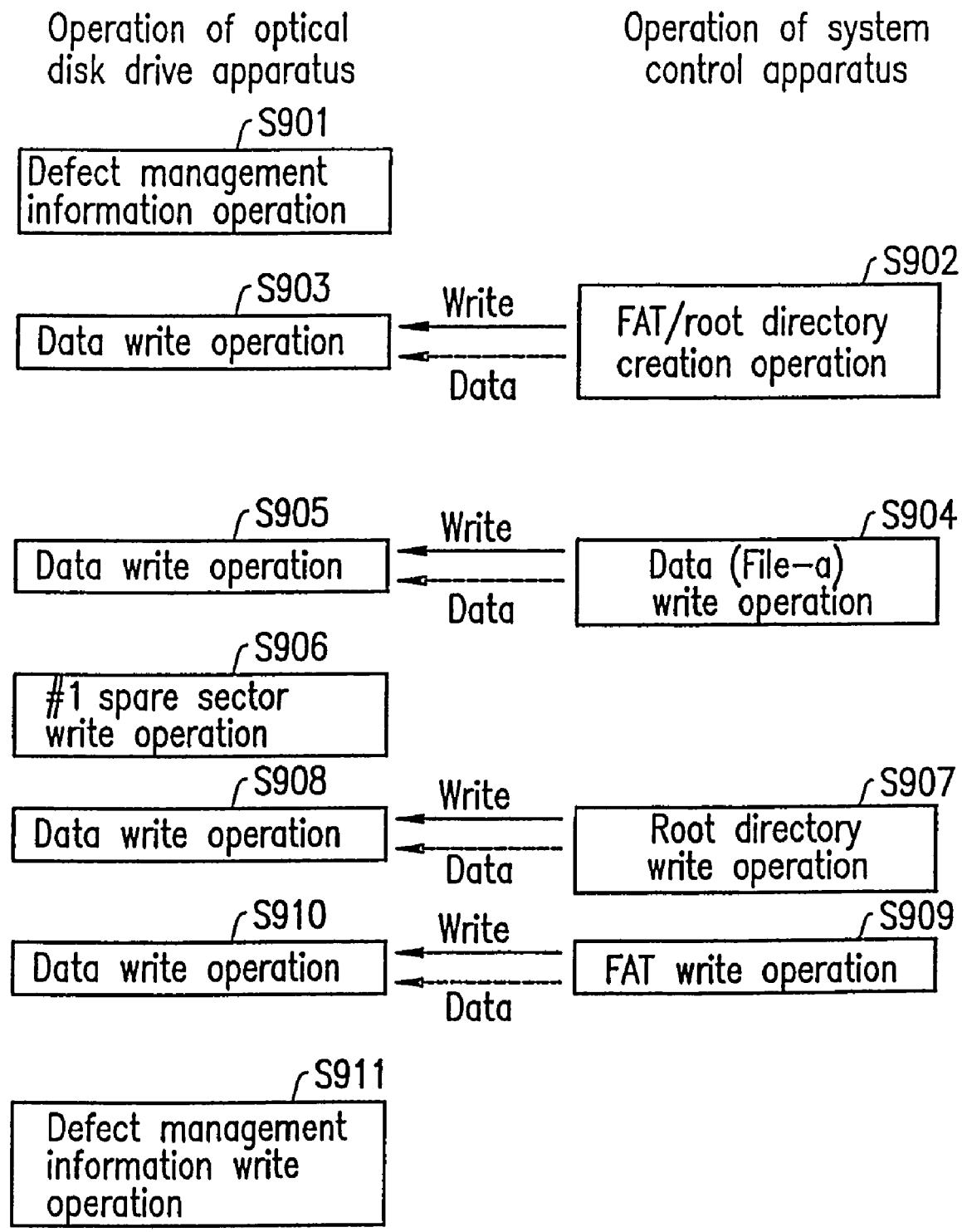
FIG. 13 is a protocol chart illustrating a procedure of a conventional format operation and a conventional data write operation.

FIG. 11 illustrates, as indicated by reference numerals 191 and 192, the data structure of the optical disk in the state denoted by reference numerals 181 and 182 in FIG. 8, respectively, in greater detail, i.e., on the descriptor level, which is defined in the ECMA167 standard.

The volume structure area 103 is arranged along the inner periphery of the volume space 100a. A main volume descriptor sequence 161 for defining the volume space 100a as a logical space, a logical volume integrity descriptor 162 having integrity information of the logical volume space 10a, an anchor volume descriptor pointer indicating the location at which to start reading out the volume structure, and a file set descriptor 164 are recorded in the volume structure area 103.

While a file set descriptor is defined as a file structure according to ECMA167, in the example illustrated in FIG. 11, a file set descriptor is defined as a volume structure for the purpose of discussion.

The volume structure area 109 is arranged in the outermost periphery of the volume space 10a. An anchor volume descriptor pointer 165 and a reserve volume descriptor sequence 156 are recorded in the volume structure area 109.

The basic file structure area 104 includes the space bit map area 113, the file entry area 114, and the root directory area 115. A space bit map for managing unallocated areas in the logical volume space 100b is recorded in the space bit map area 113. The file entry of the root directory is recorded in the file entry area 114. Information of the root directory is recorded in the root directory area 115.

The spare extension area allocation section 214 retrieves the size and the location of the unallocated area 107 based on the information reproduced from the space bit map area 113.

When the unallocated area 107 that is larger than the size of the additional spare area to be allocated as the second spare area 153 exists at the end of the logical volume space 100b (i.e., a portion along the outermost periphery of the logical volume space 100b), the spare extension area allocation section 214 updates the space bit map area 113 so as to reduce the logical volume space 100b by the size of the additional spare area (step S101).

When there is no unallocated area 107 that is larger than the size of the additional spare area, a file moving operation (step S703 in FIG. 7) is performed. As a result, data of a file which has already been recorded is moved to another area.

The spare extension area allocation section 214 updates and moves the reserve volume descriptor sequence 156 and the anchor volume descriptor pointer 165 so that the second spare area 153 can be allocated (steps S102 and S103).

The spare extension area allocation section 214 updates the main volume descriptor sequence 161 and the logical volume integrity descriptor 162 in order to define a reduced logical volume space (steps S104 and S105).

Finally, the spare extension area allocation section 214 updates an anchor volume descriptor pointer 163 in order to activate the updated volume structure and the updated file structure (step S106).

Thus, by making a part of the volume space 100*a* available, it is possible to allocate an area in which the second spare area 153 is allocated.

In the information recording medium of the present invention, the volume space in which user data can be recorded is configured so that the second spare area can be additionally allocated. Thus, it is possible to dynamically extend the spare area according to the frequency of occurrence of defective sectors. As a result, it is possible to ensure the reliability of data recording without performing an initialization operation or a re-format operation even when there occurs more defective sectors than expected.

Since the spare area can be extended according to the frequency of occurrence of defective sectors, it is possible to maximize the amount of user data which can be recorded in the logical volume space.

When data is recorded in an area to be allocated as an additional spare area, the additional spare area can be allocated after moving the data to another area. Thus, it is possible to increase the freedom in the area where an additional spare area can be allocated.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed:

1. An information recording medium including a plurality of sectors, the information recording medium comprising a data recording area, the data recording area including:

a first spare area having a replacement area including a spare sector for replacing a defective area including a defective sector among the plurality of sectors;

a defect management information area in which defect management information for managing the replacement of the defective area including the defective sector by the replacement area including the spare sector is recorded; and a volume space, wherein:

each of the sectors in the data recording area is assigned a physical sector number;

the volume space includes a first volume structure area, a second volume structure area, and a logical volume space;

the physical sector number assigned to the sector of the second volume structure area is larger than the physical sector number assigned to the sector of the first volume structure area, and the physical sector number assigned to the sector of the logical volume space is larger than the physical sector number assigned to the sector of the first volume structure area and is smaller than the physical sector number assigned to the sector of the second volume structure area;

in the data recording area, by moving the second volume structure area in a direction along which the physical sector number decreases, a second spare area having a replacement area including a spare sector for replacing a defective area including a defective sector among the plurality of sectors can be allocated in an area including a sector having a physical sector number which is larger than a physical sector number assigned to the spare sector in the first spare area, and by moving the second volume structure area in a direction along which the physical sector number decreases, the second spare area can be extended in a direction along which the physical sector number decreases; and the defect management information area has an area for recording location information which indicates a location of the second spare area.

2. An information recording method for recording information on an information recording medium including a plurality of sectors, the information recording medium comprising a data recording area, the data recording area including:

a first spare area having a replacement area including a spare sector for replacing a defective area including a defective sector among the plurality of sectors;

a defect management information area in which defect management information for managing the replacement of the defective area including the defective sector by the replacement area including the spare sector is recorded; and a volume space, wherein:

in the data recording area, a second spare area having a replacement area including a spare sector for replacing a defective area including a defective sector among the plurality of sectors can be extended;

each of the spare sector in the first spare area and the spare sector in the second spare sector is assigned a physical sector number;

the volume space includes a first volume structure area, a second volume structure area, and a logical volume space;

the physical sector number assigned to the sector of the second volume structure area is larger than the physical sector number assigned to the sector of the first volume structure area, and the physical sector number assigned to the sector of the logical volume space is larger than the physical sector number assigned to the sector of the first volume structure area and is smaller than the physical sector number assigned to the sector of: the second volume structure area;

the physical sector number assigned to the spare sector in the first spare area is smaller than the physical sector number assigned to the spare sector in the second spare area, the information recording method comprising the steps of:

(a) obtaining information which indicates a status of consumption of the first spare area;

(b) determining whether or not to extend, in the data recording area, the second spare area having a replacement area including a spare sector for replacing a defective area including a defective sector among the plurality of sectors according to the information which indicates the status of consumption of the second spare area; and (c) when the second spare area is extended, extending the second spare area in a direction along which the physical sector number decreases by moving the second volume structure area in a direction along which the physical sector number decreases.

3. An information recording/reproducing system from an information recording medium including a plurality of sectors, the information recording medium comprising a data recording area, the data recording area including:

a first spare area having a replacement area including a spare sector for replacing a defective area including a defective sector among the plurality of sectors;

a defect management information area in which defect management information for managing the replacement of the defective area including the defective sector by the replacement area including the spare sector is recorded; and a volume space, wherein:

in the data recording area, a second spare area having a replacement area including a spare sector for replacing a defective area including a defective sector among the plurality of sectors can be extended; and each of the spare sector in the first spare area and the spare sector in the second spare sector is assigned a physical sector number, the volume space includes a first volume structure area, a second volume structure area, and a logical volume space;

the physical sector number assigned to the sector of the second volume structure area is larger than the physical sector number assigned to the sector of the first volume structure area, and the physical sector number assigned to the sector of the logical volume space is larger than the physical sector number assigned to the sector of the first volume structure area and is smaller than the physical sector number assigned to the sector of the second volume structure area; and the physical sector number assigned to the spare sector in the first spare area is smaller than the physical sector number assigned to the spare sector in the second spare area, the information recording/reproduction system comprising:

a remaining spare area amount detection section for obtaining information which indicates a status of consumption of the first spare area and information which indicates a status of consumption of the second spare area;

a spare area extension determination section for making a determination of whether or not to extend, in the data recording area, the second spare area having a replacement area including a spare sector for replacing a defective area including a defective sector among the plurality of sectors according to the information which indicates the status of consumption of the second spare area; and a spare extension area allocation section for, when the second spare area is extended, extending the second spare area in a direction along which the physical sector number decreases by moving the second volume structure area in a direction along which the physical sector number decreases.

* * * * *

UNITED STATES PATENT AND TRADEMARK OFFICE
CERTIFICATE OF CORRECTION

| | | |
|---|---|---|
| PATENT NO. | : 7,813,236 B2 | Page 1 of 1 |
| APPLICATION NO. | : 12/171328 | |
| DATED | : October 12, 2010 | |
| INVENTOR(S) | : Yoshiho Gotoh et al. | |

It is certified that error appears in the above-identified patent and that said Letters Patent is hereby corrected as shown below:

Column 30, line 39, "second spare sector" should read -- second spare area --;

Column 30, line 51, "sector of: the second" should read -- sector of the second --;

Column 31, line 4, "from" should read -- for --;

Column 31, line 12, "formanaging" should read -- for managing --; and

Column 31, line 23, "second spare sector" should read -- second spare area --.

Signed and Sealed this
Nineteenth Day of April, 2011

David J. Kappos
*Director of the United States Patent and Trademark Office*